United States Patent
Srivas et al.

(10) Patent No.: US 9,798,735 B2
(45) Date of Patent: *Oct. 24, 2017

(54) MAP-REDUCE READY DISTRIBUTED FILE SYSTEM

(71) Applicant: MapR Technologies, Inc., San Jose, CA (US)

(72) Inventors: Mandayam C. Srivas, Union City, CA (US); Pindikura Ravindra, Hyderabad (IN); Uppaluri Vijaya Saradhi, Hyderabad (IN); Arvind Arun Pande, Mumbai (IN); Chandra Guru Kiran Babu Sanapala, Hyderabad (IN); Lohit Vijaya Renu, Sunnyvale, CA (US); Vivekanand Vellanki, Hyderabad (IN); Sathya Kavacheri, Fremont, CA (US); Amit Ashoke Hadke, San Jose, CA (US)

(73) Assignee: MapR Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,733

(22) Filed: Dec. 16, 2016

(65) Prior Publication Data
US 2017/0116221 A1    Apr. 27, 2017

Related U.S. Application Data

(63) Continuation of application No. 14/951,437, filed on Nov. 24, 2015, which is a continuation of application
(Continued)

(51) Int. Cl.
*G06F 17/30* (2006.01)

(52) U.S. Cl.
CPC .. *G06F 17/30174* (2013.01); *G06F 17/30194* (2013.01); *G06F 17/30215* (2013.01);
(Continued)

(58) Field of Classification Search
CPC ......... G06F 17/30194; G06F 17/30215; G06F 17/30227; G06F 17/30575; G06F 8/68
See application file for complete search history.

(56) References Cited

U.S. PATENT DOCUMENTS 7,409,497 B1 * 8/2008 Kazar ............... G06F 17/30067
707/999.01
7,478,263 B1    1/2009 Kownacki et al.
(Continued)

FOREIGN PATENT DOCUMENTS

EP    1875384 A2    1/2008
JP    2010092222 A    4/2010
(Continued)

OTHER PUBLICATIONS

Anderson, T. et al., "Serverless Network File Systems", ACM, Dec. 1995, 21 pages.
(Continued)

*Primary Examiner* — Heather Herndon
*Assistant Examiner* — Merilyn Nguyen
(74) *Attorney, Agent, or Firm* — Michael A. Glenn; Perkins Coie LLP

(57) ABSTRACT

A map-reduce compatible distributed file system that consists of successive component layers that each provide the basis on which the next layer is built provides transactional read-write-update semantics with file chunk replication and huge file-create rates. Containers provide the fundamental basis for data replication, relocation, and transactional updates. A container location database allows containers to be found among all file servers, as well as defining prece-
(Continued)

dence among replicas of containers to organize transactional updates of container contents. Volumes facilitate control of data placement, creation of snapshots and mirrors, and retention of a variety of control and policy information. Also addressed is the use of distributed transactions in a map-reduce system; the use of local and distributed snapshots; replication, including techniques for reconciling the divergence of replicated data after a crash; and mirroring.

15 Claims, 19 Drawing Sheets

Related U.S. Application Data

No. 13/340,532, filed on Dec. 29, 2011, now Pat. No. 9,207,930, which is a continuation-in-part of application No. 13/162,439, filed on Jun. 16, 2011, now Pat. No. 9,323,775.

(60) Provisional application No. 61/356,582, filed on Jun. 19, 2010.

(52) U.S. Cl.
CPC .. *G06F 17/30345* (2013.01); *G06F 17/30227* (2013.01); *G06F 17/30575* (2013.01)

(56) References Cited

U.S. PATENT DOCUMENTS

| | | | |
|---|---|---|---|
| 7,523,110 B2* | 4/2009 | Holenstein | G06F 17/30578 707/623 |
| 7,523,123 B2 | 4/2009 | Yang et al. | |
| 7,613,740 B2* | 11/2009 | Holenstein | G06F 17/30581 370/400 |
| 7,650,331 B1 | 1/2010 | Dean et al. | |
| 7,707,165 B1 | 4/2010 | Jiang et al. | |
| 8,234,372 B2* | 7/2012 | Knapp | G06F 17/30067 709/202 |
| 8,359,495 B2* | 1/2013 | Candea | G06F 11/008 714/26 |
| 8,417,681 B1* | 4/2013 | Miloushev | G06F 17/30067 707/704 |
| 8,498,967 B1 | 7/2013 | Chatterjee et al. | |
| 8,621,270 B2* | 12/2013 | Isherwood | G06F 11/2089 714/42 |
| 8,719,223 B2 | 5/2014 | Knapp et al. | |
| 8,762,493 B1 | 6/2014 | Kirmse et al. | |
| 8,930,312 B1 | 1/2015 | Rath et al. | |
| 8,972,345 B1 | 3/2015 | Aguilera et al. | |
| 9,021,229 B2 | 4/2015 | Ananthanarayanan et al. | |
| 9,207,930 B2 | 12/2015 | Srivas et al. | |
| 9,684,453 B2* | 6/2017 | Holt | G06F 3/0608 |
| 2004/0193622 A1 | 9/2004 | Peleg et al. | |
| 2005/0246393 A1 | 11/2005 | Coates et al. | |
| 2006/0184731 A1 | 8/2006 | Corbett et al. | |
| 2006/0248273 A1 | 11/2006 | Jernigan et al. | |
| 2006/0248294 A1* | 11/2006 | Nedved | G06F 11/1464 711/162 |
| 2007/0101069 A1 | 5/2007 | Corbett et al. | |
| 2008/0127146 A1 | 5/2008 | Liao et al. | |
| 2008/0270461 A1 | 10/2008 | Gordon et al. | |
| 2009/0019098 A1 | 1/2009 | Gunda et al. | |
| 2009/0055370 A1 | 2/2009 | Dagum et al. | |
| 2009/0271412 A1 | 10/2009 | Lacapra et al. | |
| 2010/0005080 A1 | 1/2010 | Pike et al. | |
| 2010/0106934 A1 | 4/2010 | Calder et al. | |
| 2010/0114889 A1 | 5/2010 | Rabii et al. | |
| 2010/0241828 A1 | 9/2010 | Yu et al. | |
| 2011/0099351 A1* | 4/2011 | Condict | G06F 3/0608 711/216 |
| 2011/0145497 A1 | 6/2011 | Bish et al. | |
| 2011/0213994 A1 | 9/2011 | Thereska et al. | |
| 2011/0295968 A1 | 12/2011 | Takaoka et al. | |
| 2011/0313973 A1 | 12/2011 | Srivas et al. | |
| 2012/0023209 A1* | 1/2012 | Fletcher | H04L 12/40195 709/223 |
| 2014/0081918 A1 | 3/2014 | Srivas et al. | |
| 2015/0154243 A1 | 6/2015 | Danaher | |

FOREIGN PATENT DOCUMENTS

| | | |
|---|---|---|
| WO | 2006015097 A2 | 2/2006 |
| WO | 2008058230 A2 | 5/2008 |

OTHER PUBLICATIONS

Cabrera, L. et al., "Swift: Using Distributed Disk Striping to Provide High I/O Data Rates", California, USA, Nov. 1991, 21 pages.
Ghemawat, S. et al., "The Google File System", SOSP 03; New York, USA, Oct. 19-22, 2003, 15 pages.
Gibson, G. et al., "A Cost-Effective, High-Bandwidth Storage Architecture", Proc. of the 8th Conference on Architectural Support for Programming Languages and Operatina Systems, Oct. 1998, 12 pages.
Gillick, et al., "MapReduce: Distributed computing for Machine Learning", Dec. 18, 2006, 12 pages.
Schmuck, F. et al., "GPFS: A Shared-Disk File System for Large Computing Clusters", Proc. of the Conference on File and Storage Technologies (FAST '02), California, USA, Jan. 28-30, 2002, pp. 231-244.
Vahalia, Uresh, "UNIX Internals: The New Frontiers", UNIX Internals: The New Frontiers, Pearson Education Ltd., May 15, 2000, 1st Ed., pp. 371-374, 378-382 and 411-415.
White, Tom, Hadoop, O'Reilly Japan, Inc., Feb. 15, 2010, 1st Ed., pp. 43-47.

* cited by examiner

MAP-REDUCE READY DISTRIBUTED FILE SYSTEM

CROSS REFERENCE TO RELATED APPLICATIONS

This application is a continuation of U.S. patent application Ser. No. 14/951,437, filed Nov. 24, 2015, which is a continuation of U.S. patent application Ser. No. 13/340,532, filed Dec. 29, 2011, now U.S. Pat. No. 9,207,930, which is a continuation-in-part of U.S. patent application Ser. No. 13/162,439, filed Jun. 16, 2011, now U.S. Pat. No. 9,323,775, which claims priority to U.S. provisional patent application Ser. No. 61/356,582, filed Jun. 19, 2010, each of which application is incorporated herein in its entirety by this reference thereto.

BACKGROUND OF THE INVENTION

Technical Field

The invention relates to computer file systems. More particularly, the invention relates to a map-reduce ready distributed file system.

Description of the Background Art

Distributed cluster computing using the map-reduce style of program was described by Jeffrey Dean and Sanjay Ghemawat. See, J. Dean, S. Ghemawat, *MapReduce: Simplified Data Processing on Large Clusters*, OSDI'04: Proceedings of the 6th Conference on Symposium on Operating Systems Design & Implementation, USENIX Association (2004). In this style, computation is broken down into a map phase, a shuffle phase, and a reduce phase. FIG. 1 shows a simplified schematic of this form of computation. An input 101 is divided into pieces referred to as input splits. Each input split is a contiguous range of the input. Each record in each input split is independently passed to instances of a map function 102, represented herein as $f_1$. This map function is defined to accept a single record as an input and to produce zero or more output records, each of which contains a key and a value. The output records from the map functions are passed to the shuffle 103 which rearranges records so that all values with the same key are grouped together. Instances of the reduce function 104 are represented herein as $f_2$. The reduce function is defined to take two arguments, the first being a key value and the second being a list of values. The output of $f_2$ consists of zero or more records which are stored in output files 105.

This style of computation provides sufficient generality to be widely useful for processing large scale data, while simultaneously having simple enough semantics to allow high degrees of failure tolerance. However, map-reduce programs impose severe loads on file systems that are difficult to support with conventional file systems.

The original map-reduce implementation at Google (see U.S. Pat. No. 7,650,331) was accompanied by a write-once file system referred to as GFS. Subsequently, the Apache Hadoop project has built a rough clone of Google's map-reduce known as Hadoop. Associated with Hadoop is a file system known as the Hadoop Distributed File System (HDFS) that fills the same role as GFS.

Both GFS and HDFS are write-once file systems that adopt replication across several machines as a reliability mechanism over more traditional error correcting methods, such as RAID. The write-once semantics of both systems makes replication a relatively simple strategy to implement. The replication also allows map-phase tasks to be placed near a copy of the data being read, giving a substantial performance boost due to the fact that disk access is generally considerably faster than network access.

Both Google's map-reduce and Hadoop use local file systems during the shuffle phase largely because it is difficult to support the file-create loads imposed by the shuffle. For instance, a large computation with 10,000 map splits and 1000 reducers produces 10 million output partitions. The simplest implementation of the shuffle would use the distributed file system to store each of these partitions in a separate file. Such an approach makes the shuffle operation almost trivial, but it requires that the cluster be able to create these millions of files within a few seconds. Unfortunately, HDFS is limited to a file creation rate of at most a thousand files per second and GFS is also limited in this respect. These limits occur because a central meta-data server handles meta-data and block location lookup in both HDFS and GFS. The implementation choice to use a central meta-data and location server is forced by the write-once nature of the file system because file meta-data is highly mutable.

Storing shuffle partitions as local files is also not feasible in either Hadoop or GFS because the local file systems cannot support the simultaneous access to tens of thousands of files by multiple processes. The constraints imposed by the local file system have lead to complex shuffle implementations that are very difficult to get to a bug-free state and that are difficult for users to tune for performance.

Systems such as Hadoop also suffer severe performance penalties when large numbers of small to medium sized files are stored in the system. The write-once nature of the files, combined with the desire for large files and the need for data to be integrated within minutes of receipt often leads to applications which record data for short periods of time and then repeatedly concatenate files to form large files. Managing the concatenation and safe deletion of small files is time consuming and wastes large amounts of resources. There are estimates that as much as half of the cluster capacity at companies such as Twitter and Facebook is devoted to the concatenation of files in this fashion.

The history of distributed file-systems is long and varied but for the key design points of a map-reduce ready distributed file system a small number of systems can be used to illustrate the state of the art. None of these systems meets the need for full support of a map-reduce cluster in terms of transactional integrity, read/write access, large aggregate bandwidth, and file-create rate. More importantly, the methods used in these systems to meet one or more of these requirements separately make it impossible to meet the other requirements. This means that it is not possible to meet all of the requirements by simply combining methods from these systems.

As discussed above, GFS and HDFS provide write-once, replication-based file systems. The use of replicas provides high bandwidth, but makes transactional integrity in a read/write environment difficult. This motivates the write-once design of these systems and that write-once nature forces the use of a central meta-data server. Central meta-data servers, in turn, make it nearly impossible to meet the file create rate requirements. Thus, the mechanism used in GFS and HDFS to meet the bandwidth requirement inherently precludes meeting the read/write and file-create requirements without new technology. In addition, both HDFS and GFS are severely limited in terms of the total number of files that they can manage.

GPFS is a distributed file system from IBM that has been used in a limited way with Hadoop. See http://publib.boulder.ibm.com/infocenter/clresctr/vxrx/index.jsp?topic=%2Fcom.ib m.cluster.gpfs31.advanceadm.doc%2Fbl11adv_gpfsrep.html. GPFS provides coherent read/write capabilities by using a distributed lock manager that allows a single node to be specified as the master for each file or file region. GPFS is able to support relatively large file stores without a centralized metadata store, but the locking scheme is unable to support high file-create rates because the throughput on the lock manager is very limited. Based on published documentation (see F. Schmuck, R. Haskin, GPFS: *A Shared-Disk File System for Large Computing Clusters*, Usenix FAST Conference 2002, http://www.usenix.org/publications/library/proceedings/fast02/schmuck.html), the creation of 10 million files in one second in a cluster of 1000 machines would require over 2000 lock manager servers. Realistic clusters are limited to considerably less than one hundred thousand file-create operations per second.

In GPFS, replication is only supported as part of a disaster recovery scheme through mirroring. The lack of a first-class replication limits aggregate read bandwidth. In addition, the mirroring scheme requires quorum semantics to avoid loss of data, which makes the cluster much more failure sensitive.

pNFS (see http://www.pnfs.com/) is a parallel NFS implementation that uses many NFS servers and a central metadata server. pNFS lacks transactional update support and, thus, does not provide coherent read/write semantics with replicas. The use of a central meta-data server severely limits the maximum file-create rate. The use of a farm of independent NFS servers for object storage makes file chunk replication difficult as well because there is no easy way to support transactionally safe replication with NFS servers. Node failure tolerance also appears to be a difficult problem with pNFS.

Ceph is an experimental distributed file system that uses an object store with an associated meta-data server. See S. Weil, S. Brandt, E. Miller, D. Long, C. Maltzahn, Ceph: *A Scalable, High-Performance Distributed File System*, Proceedings of the 7th Conference on Operating Systems Design and Implementation, OSDI '06 (November 2006). Ceph is unable to provide coherent file chunk replicas and thus is bandwidth limited. Replication was added to Ceph as an afterthought, thus it is not suitable for use in failure-tolerant map-reduce systems. The meta-data server also imposes a limit on file-create rates. While Ceph avoids the problem of having a single meta-data server, it is still limited in terms of the number of file-creates that can be performed per second.

AFS is a distributed file store that has no support for read-write replication. See http://www.cmu.edu/corporate/news/2007/features/andrew/what_is_andrew.shtml. Under read loads, AFS allows caching of file contents close to the file client. These caches are revoked when updates are done. There is also no support for running the application on the same machine as the fileserver, thus data-locality is absent. Because there is only one master copy of any file, failures in large clusters means data becomes unavailable.

None of the foregoing systems is able to provide a fully distributed, replicated file system that allows transactional updates and cluster-wide snapshots while still supporting the requisite file-create rate imposed by map-reduce systems. Map-reduce programs can be executed using such file systems, but only by moving some of the load associated with map-reduce computation off of the file system and into a secondary storage system. Failure tolerance where file update is supported is also not sufficient in these systems to allow large-scale operation with commodity grade equipment.

SUMMARY OF THE INVENTION

A distributed file system that provides transactional read-write-update semantics with file chunk replication and huge file-create rates offers major technical advantages for map-reduce computing clusters. The herein disclosed file system has a number of technical innovations that make this possible for the first time and thus provides an example of how a map-reduce compatible distributed file system can be built. This file system consists of successive component layers that each provide the basis on which the next layer is built. These include:

A primitive storage layer referred to as storage pools. Storage pools knit together raw block stores and provide a storage mechanism for containers and transaction logs. Storage pools are manipulated by individual file servers.

Containers which provide the fundamental basis for data replication, relocation and transactional updates.

A container location database which allows containers to be found among all file servers, as well as defining precedence among replicas of containers for the purposes of organizing transactional updates of container contents.

Volumes which facilitate the control of the placement of data, creation of snapshots and mirrors, and the retention of a variety of control and policy information.

Key-value stores which allow keys to be related to data for many purposes such as directories, container location maps, and offset maps in compressed files.

Aspects of the invention address the use of distributed transactions in a map-reduce system; the use of local and distributed snapshots; replication, including techniques for reconciling the divergence of replicated data after a crash; and mirroring.

DETAILED DESCRIPTION OF THE INVENTION

The herein disclosed distributed file system provides transactional read-write-update semantics with file chunk replication and huge file-create rates provides major technical advantages for map-reduce computing clusters. The subject file system has a number of technical innovations that make this possible for the first time and thus provides an example of how a map-reduce compatible file system can be built.

Figure 1:
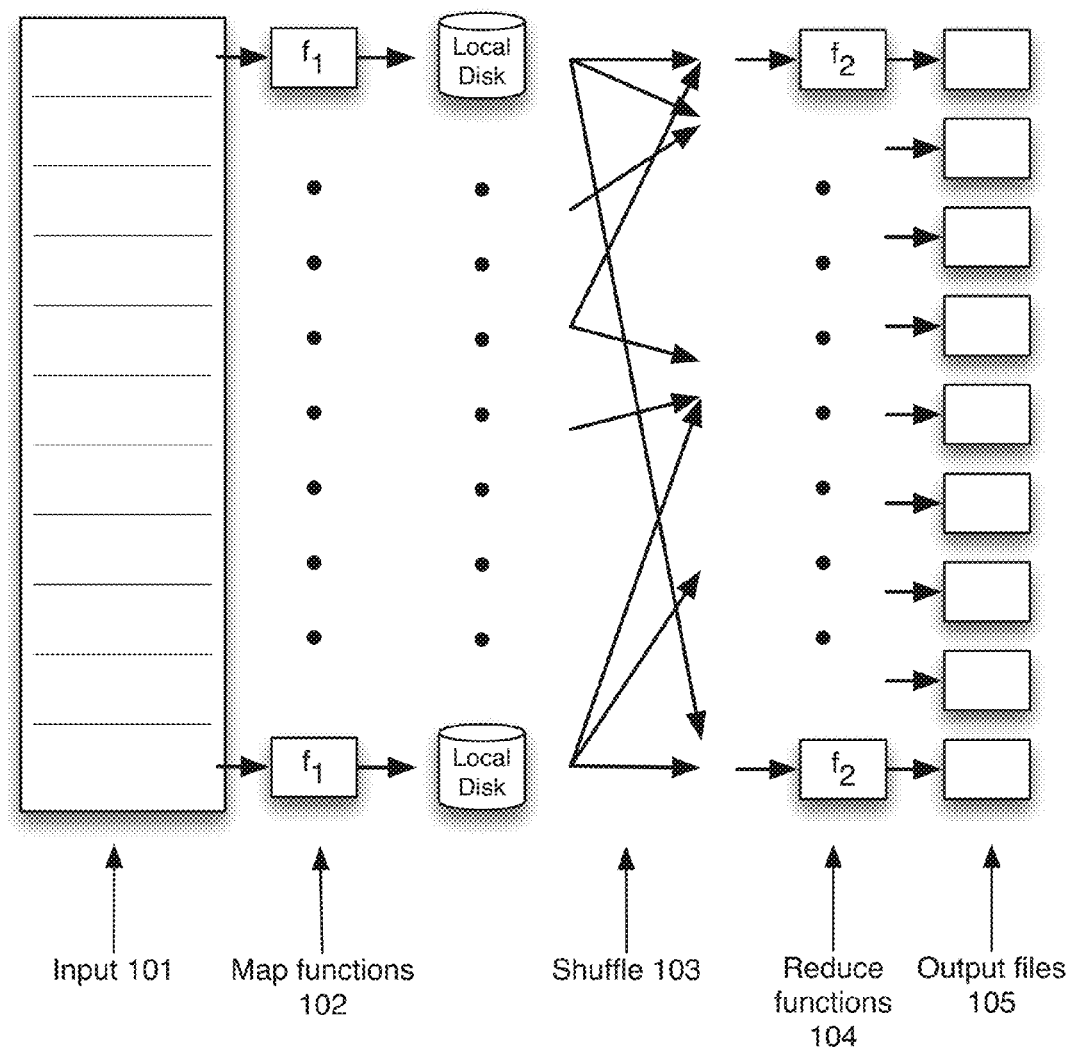
FIG. 1 is a block schematic diagram that shows an outline of a conventional map-reduce process with shuffle contained in local file systems.
Figure 2:
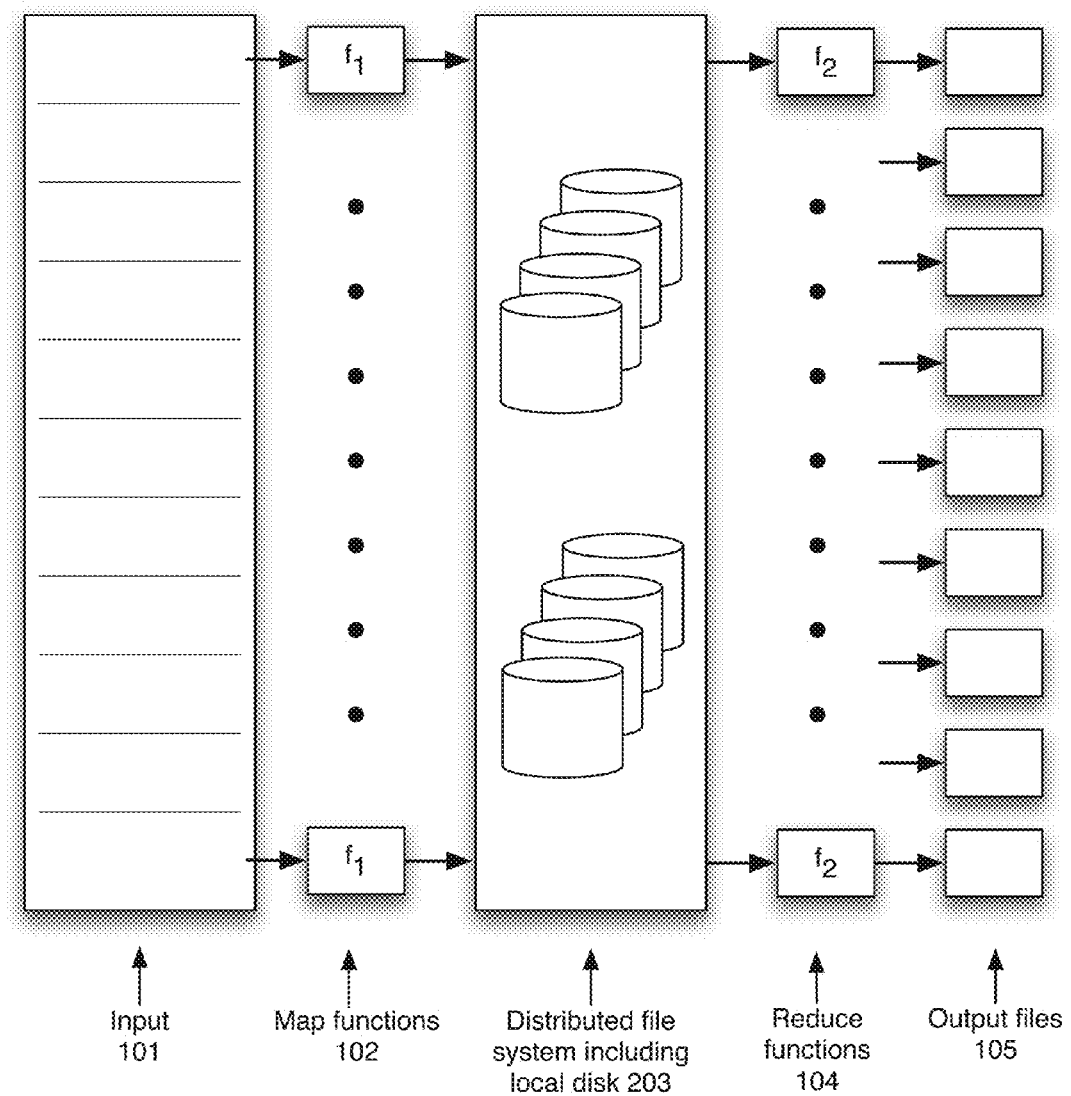
FIG. 2 is a block schematic diagram that shows an outline of the map-reduce process in which shuffle is contained in a distributed file system, where inputs and outputs may or may not be in the distributed file system, according to the invention.

FIG. 2 is a block schematic diagram that shows an outline of the map-reduce process in which shuffle 203 is contained in a distributed file system, and in which inputs and outputs may or may not be in the distributed file system according to the invention. This file system consists of successive component layers that each provide the basis on which the next layer is built. These are discussed in greater detail below and include:

- A primitive storage layer referred to as storage pools. Storage pools knit together raw block stores and provide a storage mechanism for containers and transaction logs. Storage pools are manipulated by individual file servers.
- Containers which provide the fundamental basis for data replication, relocation and transactional updates.
- A container location database which allows containers to be found among all file servers, as well as defining precedence among replicas of containers for the purposes of organizing transactional updates of container contents.
- Volumes which facilitate the control of the placement of data, creation of snapshots and mirrors, and the retention of a variety of control and policy information.
- Key-value stores which allow keys to be related to data for many purposes such as directories, container location maps, and offset maps in compressed files.

In addition, there are other data structures that facilitate the implementation of these primary components. These additional data structures will be introduced as they come up in the following discussion of the primary components and capabilities of the herein disclosed distributed file system.

Container Location Database

Figure 3:
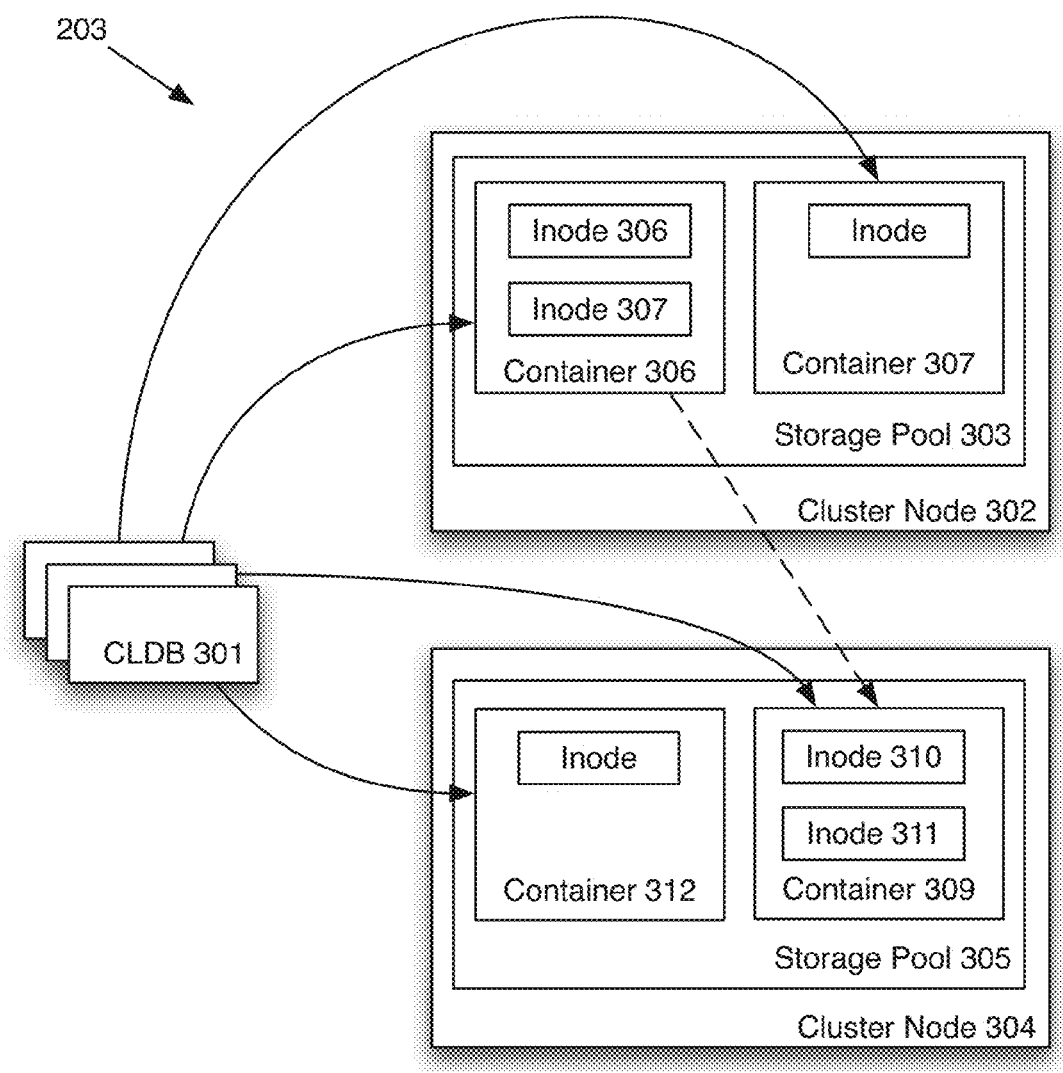
FIG. 3 is a block schematic diagram that shows the structure of distributed file system including a container location database (CLDB) and cluster nodes according to the invention.

FIG. 3 is a block schematic diagram showing the structure of distributed file system 203 having a container location database (CLDB) 301 and cluster nodes 302, 304. Each cluster node contains one or more storage pools 303, 305. Each storage pool can contain zero or more containers 309, 312. Data is structured within containers using inodes, e.g. 306, 308, 310, 311. Containers are replicated to other cluster nodes with one container designated as master, e.g. container 306 for each replica chain. The CLDB maintains information about where each container is located. The CLDB is maintained by several redundant servers and the data in the CLDB is itself stored as inodes in well known containers.

A fraction of the nodes in a cluster in the herein disclosed distributed file system are designated to store the container location database (CLDB). For failure tolerance in small clusters, it is common to designate at least three such nodes. For larger clusters, five nodes are typically designated.

The CLDB nodes serve to maintain a database that contains at least the following information about all containers in the system:

The nodes that have replicas of the container;

The versions of the container available on each node with a replica of that container; and The ordering of the replication chain for each container.

In addition, the CLDB nodes designate one of their number to serve as a master. This transaction master is set as the head of the replication chain for a special container that holds the container location database itself. All updates to the container location database are coordinated using the normal container replication mechanisms detailed below.

The designation of the CLDB master is done using a leader election based on a coordination service. In one embodiment, the coordination service uses Apache Zookeeper, which itself uses a simplified form of Paxos, to guarantee consistent updates in the presence of node failures or network partitions. Apache Zookeeper is very conservative about guaranteeing that transactions are made on a majority of its component nodes and as a result can handle only limited update rates. Because the distributed file system only uses Zookeeper to designate a master CLDB node reliably, this is not a limitation. Thus, the CLDB itself can run with fewer than majority number of copies (even with a single copy), and only relies on an external quorum provider to distinguish who has the latest.

The CLDB is only updated when a container is moved, when a node fails, or as a result of periodic block change reports. This results in a relatively low update rate, even for very large clusters. The query rate for CLDB is even lower because container locations can be cached indefinitely. Cache consistency errors in container location information are detected whenever out of date information is used, so an explicit cache coherency protocol is not required. Container version information is only required when a node rejoins a cluster, so all that file servers need to cache is the actual location of containers.

In addition to having very low update and query rates, the CLDB itself is very small compared to, e.g. the Hadoop namenode. The Hadoop namenode, in contrast, has to track meta-data and block numbers for all files, as well as block locations for all blocks in every file. Because blocks are typically 200 MB or less in size, the total number of items to be tracked by a Hadoop namenode is quite large. In contrast, containers in the herein disclosed distributed file system are much larger, averaging 10 to 30 GB in size, which makes the location information 100 to 1000 times smaller than the location information in a Hadoop namenode. The CLDB does not retain any file meta-data at all, leading to further savings. In addition, because the container location data is so effectively cached, the CLDB can be heavily paged without any visible performance difference and need not reside in main memory.

These factors allow the herein disclosed distributed file system to grow in scale to hold millions of containers or more. This implies that clusters holding 10's of exabytes of data are practical, regardless of the number of files. Apache Hadoop, in contrast, is limited to a few tens of millions of files by the fact that the entire name node must reside in memory and the total size is typically limited to a few peta-bytes.

File create rates are also typically massively higher with the herein disclosed distributed file system than any other file system. Even on a small cluster of ten nodes, a file system in accordance with the invention can create files at nearly 100 times the rate of a Hadoop cluster of the same size. This ratio scales linearly with cluster size so on 1000 nodes, the herein disclosed distributed file system can create files at a rate nearly four orders of magnitude faster than a Hadoop cluster of the same size.

Replication and Data Structure Versioning

Containers in the distributed file system are the unit of replication. The container location database (CLDB) assigns as many nodes as are necessary to meet policy constraints to act as replicas of the data in a container. Replication must, however, survive as many combinations of node failures as possible. One strategy used for this is to have the CLDB assign each container to a master node that controls all transactions for that container. In addition, the CLDB designates a chain of nodes to hold replicas. If one of the replicas goes down or is separated from the master CLDB node, it is removed from the replication chain. If the master goes down or is separated, a new master is designated. Any node that comes back after having been removed from the replication chain is reinserted at the end of the replication chain if the chain still needs another replica when the node returns. If the node returns quickly, it is likely that no new node to replicate the container in question has been designated and the chain still needs a replica. If the node has been gone for a long time, the CLDB may have designated some other node to take a place in the chain in the meantime.

Updates to replication chains are normally performed transactionally, with the container master controlling the transaction. This guarantees that all replicas of a container are up to date. Such updates can be performed by locally locking the master replica and waiting until all other replicas report success or fail. In either case, the locks are released. When nodes are restored to a replication chain, however, they have not seen any transactions that occurred while they were out of touch. Conversely, they likely still have a significant amount of old data that is still current. Because these nodes may have been out-of-touch for an arbitrarily long period of time, and there is no guarantee that a node will ever return, it is not feasible to retain a transaction log until the node returns. In the distributed file system herein, the file system data itself can be examined to find the minimum set of updates that allow reconstruction of container replication chain state without requiring that all transactions be replayed or even retained.

All inode data structures and indirect data b-trees have version numbers to facilitate updating container replicas that have missed transactions. To bring a replication chain up to date, a snapshot of the container inode on the replication master is created to freeze any further changes during the update process. The last version of the snapshot is compared to the last version of the replication chain to be updated. If the versions are equal, no updates are needed. If an update is needed, each child of the snapshot inode is examined recursively in the same fashion to find inodes or blocks in the replication chain that are behind the snapshot. Once the replication chain is up to date with the master snapshot, the entire process of snapshot replication can be repeated or transactions from the master replicas write-ahead log can be replayed to bring the replication chain fully up to date.

Another option is to freeze updates on the container master temporarily and copy changed blocks to the new replication chain. The updated replication chain is made available in a transactional manner so that all updates to replicas appear to appear all at once at the completion of the replication process. This update process also makes the update of seriously out of date replica chains much more efficient because only the current versions of changed blocks are copied.

This transactional snapshot based replication allows operation to continue normally under almost all plausible failure scenarios and, in a degraded fashion, even under extreme failure scenarios. For example, suppose there are three replication chains of a container, A, B, and C. Assume that C becomes unavailable and after that A and B receive updates. Then, if A and B both become unavailable and C returns, the system can still function, if desired. The system knows that C is out of date and can make C available in a read-only mode if allowing C to regress to a previous state is acceptable. It is even possible commit to the regressed state by designating C the current version. If C is not so designated and A or B eventually return, however, the system can recognize that they are up to date and can restore C to match A and B, re-establish a replication chain and continue normal operations. Such partial failure scenarios are not typically possible in conventional transactional systems. Moreover, as long as at least one up to date replication chain stays up, no data is lost at all. This is in contrast with systems that require quorum updates because such systems go into a read-only mode as soon as half or more of the replicas of the system become unavailable.

Several mechanisms are possible for avoiding updates to an out of date replication chain such as C in this example. One is to have all nodes periodically report to CLDB a list of changed containers that they have together with the latest version in the container. When a failed node returns and tries to re-establish contact with a replication chain for a particular container, it contacts the CLDB which returns the locations and latest version of the container in question. If the container is out-of-date and updating the container is not possible due to no other copies being present, the returning node realizes this and is able to provide the container on a read-only basis.

Because all replication chain updates are performed in a completely transactional manner, the herein disclosed system can use hard-mount semantics and guarantee that all writes either succeed or hang until they succeed. If a node in a replication chain fails during a write, the write is restarted with a revised replication chain. Once all nodes in the replication chain have reported that they have applied the update, the write succeeds. The write fails only if none of the replication chains of the container being updated are available. Indeed, in such a situation because at that point, the object being written no longer exists in the file system. As long as some chain of custody of up-to-date containers exists, no data is lost.

Similarly, if a minimum number of replication chains is required for any updates to proceed, then it can be guaranteed that there is a continuous chain of custody in which at one node is live with the latest version of the container as long as the rate of multiple failures is not so high that no new replication chains can be recruited and updated. During periods when the minimum number of replication chains is not available, updates are inhibited, which prevents a specifiable number of failures from making the latest version unavailable. During these failure scenarios, additional replication chains are recruited from the rest of the cluster so the window of vulnerability is limited to the time required to copy the container to a new replication chain. For typical container sizes and with two 1 Gb/s Ethernet data links available, this should take about a minute. With 10 Gb/s data links, this time is reduced to tens of seconds.

Storage Pools and File Servers

Data in the distributed file system is ultimately stored on multiple block-addressable data stores. These data stores can be block devices that represent entire disks or flash memory systems or partitions of either of these. These data stores can also be individual files stored in a conventional file system, such as the Linux ext3 file system. At this lowest level, all that is important is that each data store support random reading and writing of relatively small, fixed-size blocks of data. In the herein disclosed system, these blocks are typically 8 k bytes, but those skilled in the art will appreciate that other reasonable block sizes could have been chosen. The chosen size is large enough to allow large data stores to be addressed with fewer bits, but small enough to be a fraction of the average expected file size. Regardless of how they are actually stored, these data stores are referred to as disks in the file system because the most common use case is for a file store to consist of a block device representing a single partition spanning an entire hard disk.

Disks in the distributed file system are combined in various ways to provide higher level block addressable objects. These combinations can include concatenation, mirroring, and striping. These combinations differ in the ways that updates and accesses to the composite object are translated into updates and accesses to the component objects. In concatenation of two disks, all updates and accesses to blocks with addresses less than the size of a first component disk are addressed to that first disk while all other updates and accesses are directed to a second disk. With mirroring, updates go to all component disks and accesses go to any component disk chosen at random. With striping a component disk is chosen by taking the block address for the update or access modulo the number of disks and the address used for the component is derived by taking the quotient of the original address and the number of component disks. The result of any such combination can be considered a disk in its own right.

Figure 4:
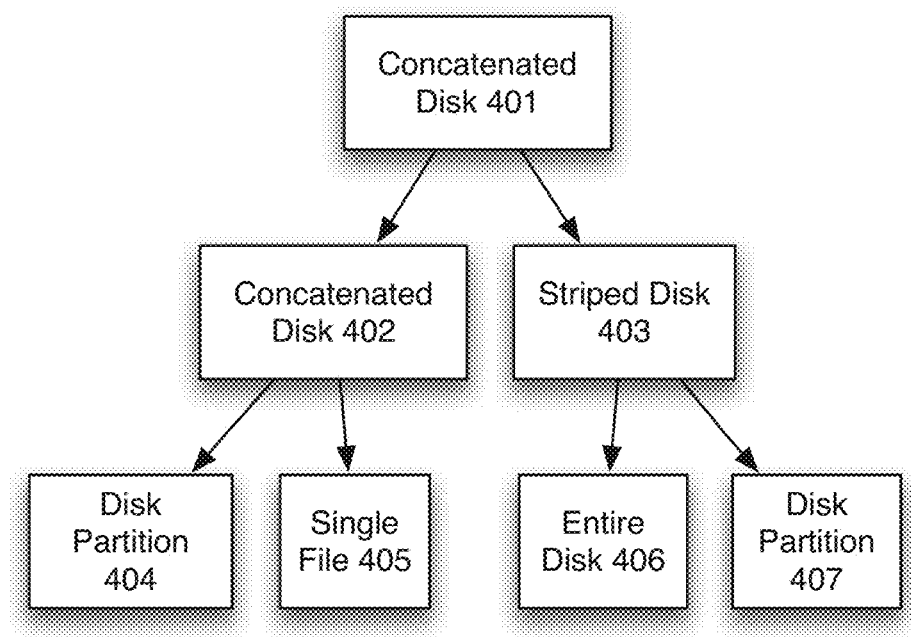
FIG. 4 is a block schematic diagram that shows how a storage pool can be constructed from primitive elements such as disk partitions, single files, or entire disks.

FIG. 4 is a block schematic diagram that shows how a storage pool can be constructed from primitive elements, such as disk partitions, single files, or entire disks. The composite concatenated disk 401 in this case is composed of the concatenation of a concatenated disk 402 and a striped disk 403. The concatenated disk 402 is composed of the concatenation of a single disk partition 404 and a single file 405. The striped disk 403 is composed of a partition covering an entire disk 406 and a single partition 407, possibly one of many, on a disk. All updates and accesses to the composite disk 401 are ultimately resolved into an update or access to one of the underlying primitive data stores 404 through 407.

Figure 5:
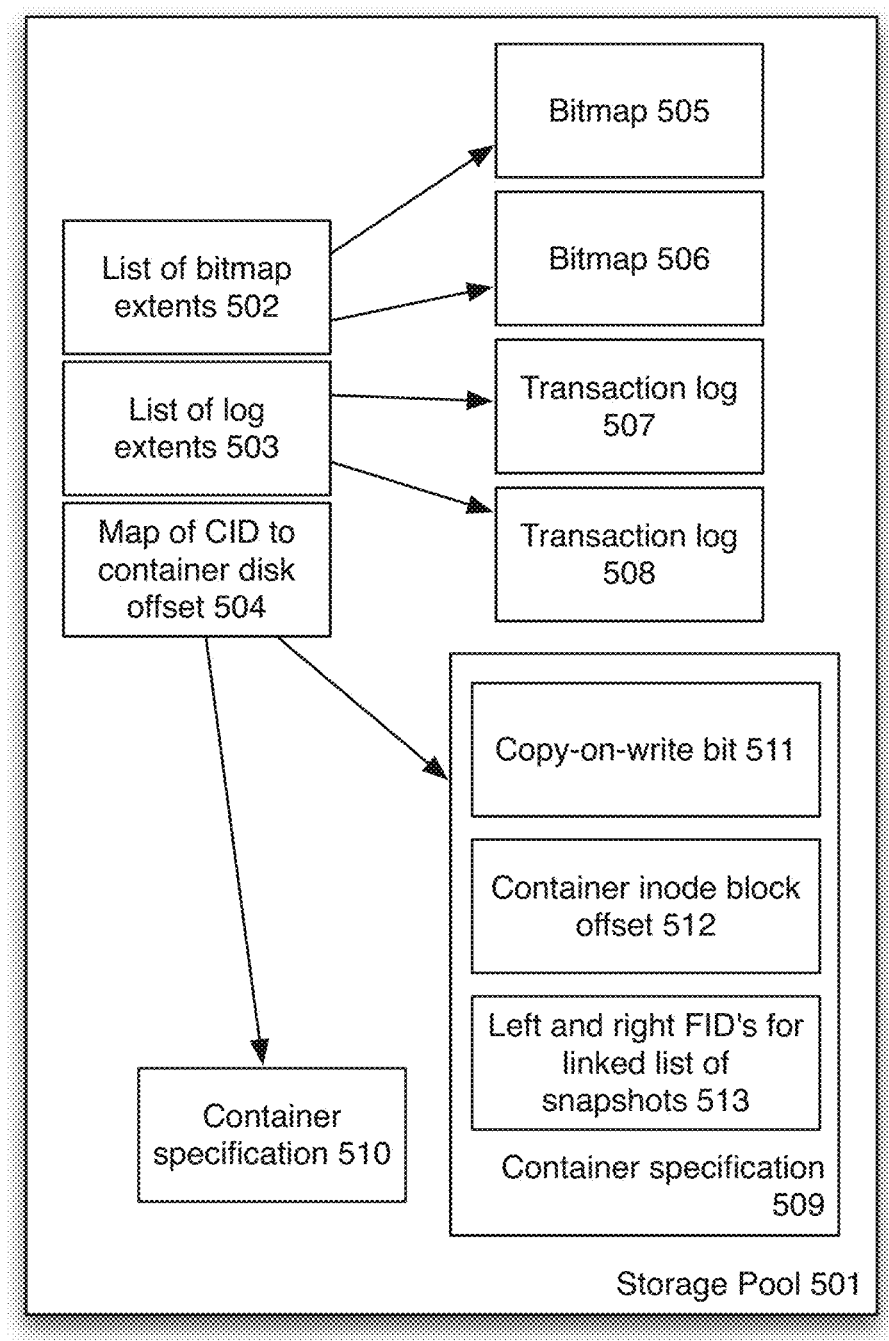
FIG. 5 is a block schematic diagram that shows the structure of a storage pool according to the invention.

FIG. 5 is a block schematic diagram that shows the structure of a storage pool 501. The list of bitmap extents 502, list of log extents 503, and map of CID to container disk offset 504 are stored in a super block that is replicated to several well known locations in the storage pool. The list of bitmap extents has pointers to multiple block allocation bitmaps 505, 506 for the storage pool. The list of log extents contains pointers to portions of the storage pool that are used to store transaction logs 507, 508 for the storage pool. The map of container id (CID) to disk offsets has pointers to where the container specifications 509, 510 are located for the containers found in the storage pool and container id's that form a linked list of snapshots 513.

Thus, a storage pool is defined as a disk, either composite or primitive, that contains four key components:

A super-block that contains offsets to the starting points of the other three components;

A block allocation bitmap indicating which blocks in the disk are in use. In the distributed file system, the block allocation bitmap is stored as a list of pointers to contiguous disk regions that contain bitmap data. In FIG. 5, two bitmaps 505 and 506 are shown, but arbitrarily many might actually be used.

A transaction log that is used to facilitate ACID transactions of the contents of the storage pool. In the distributed file system, the transaction log is stored as a list 503 of pointers to disk regions that hold the actual log data. In FIG. 5, two log extents 507 and 508 are shown.

The container map which contains a mapping 504 from container id to the specification of each container in the storage pool. Two container specifications 509 and 510 are shown in FIG. 5, but any number might exist in a storage pool. Some of the contents of a container specification 509 include a bit to indicate whether the container has been marked as copy-on-write 511, where the container is actually located on disk 512, and a list of snapshots 513 of the container. Other data about the container may be stored as well.

Storage pools are managed and mutated by the file server component that hides the details of the storage pools from other components. The file server accepts messages from other components, such as the container location database or from client programs that specify requests for updates or accesses to containers that are managed by the file server.

Containers

Figure 6:
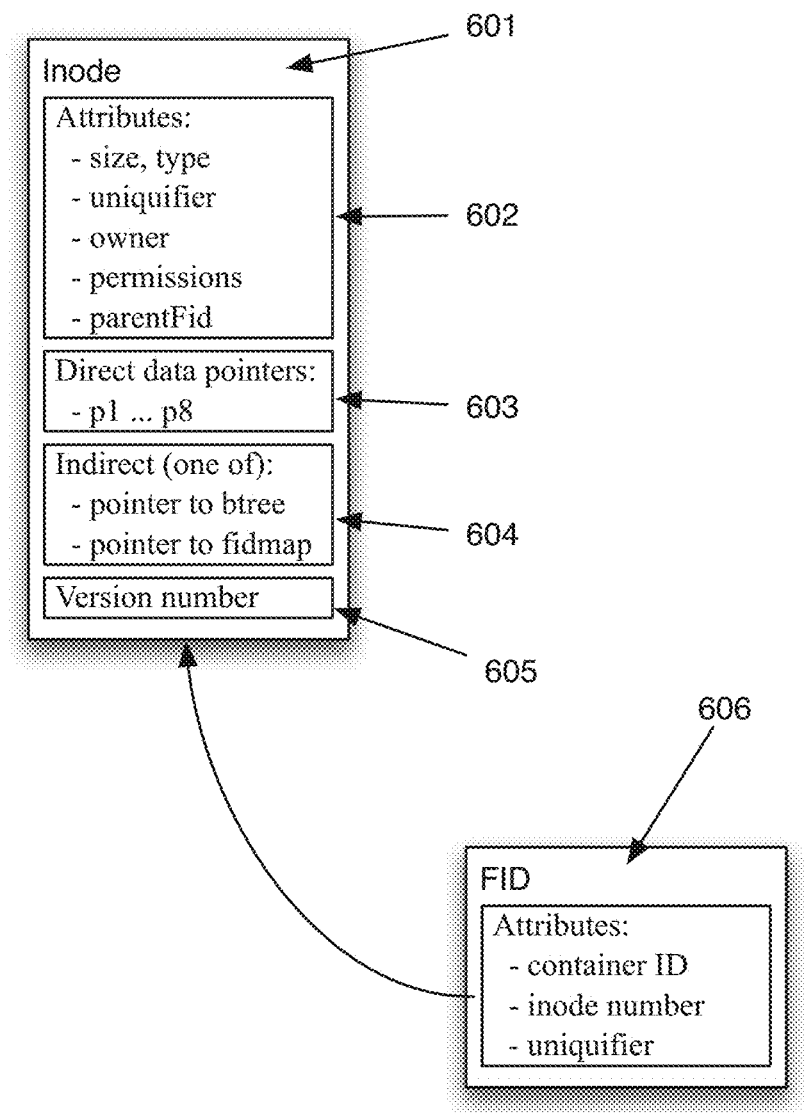
FIG. 6 is a block schematic diagram that shows a FID (file identifier) which refers to an inode in a particular container according to the invention.

At a higher level of abstraction than bytes in a storage pool, the distributed file system has an object referred to as a container. All structures within a container are described by data structures known as inodes. FIG. 6 is a block schematic diagram that shows an FID (file identifier) 606 that refers to an inode 601 in a particular container. All forms of inode have some common structure. The inode 601 in this embodiment is a composite data structure that contains attributes 602 that describes various aspects of the object including owner, permissions, parent FID, object type, and size. The object type can be local file, chunked file, directory, key-value store, symbolic link, or volume mount point, among other possibilities. The inode also contains pointers 603 to eight disk blocks that contain the first 64 k bytes of data in the object. Each of these pointers has an associated copy-on-write bit stored with the pointers 603. The inode 601 also contains references 604 to indirect data. In the case of local files, this reference 604 can also be a pointer to a B+ tree that contains the object data, along with a copy-on-write bit for that tree. In the case of a chunked file, the reference 604 can point to a local file, referred to as a FID map, that contains FID's that refer to local files in other containers containing the content of the file. The references in this embodiment of the inode can refer to either a b-tree or a FID map, but not both. Other implementations are possible where both kinds of references are used simultaneously. Symbolic links and volume mounts store the name of the file or volume being referenced as string data in the direct data blocks of an inode. The internal structure of a chunked file is described below. The inode 601 also contains a cache 605 of the latest version number for any structure referenced from the inode. This version number is used in replication and mirroring. References to an inode 606 are referred to as FID's and are composed of a container id, the inode number, and an integer chosen to make the contents of the FID unique, even if an inode is re-used for a different purpose.

A local file is an object in the distributed file system that contains bytes entirely within a single container. A local file is represented by an inode that has up to eight direct references to disk blocks for the first 64 kB of data. For local files longer than 64 kB, the b-tree link points to a b-tree whose values are 64 kB data blocks known as cluster descriptors. The keys for the b-tree are the byte offset for the beginning of the corresponding cluster descriptor. Because the low-order 16 bits of these byte offsets are always 0, the key is actually the byte offset divided by $2^{16}$.

Figure 7:
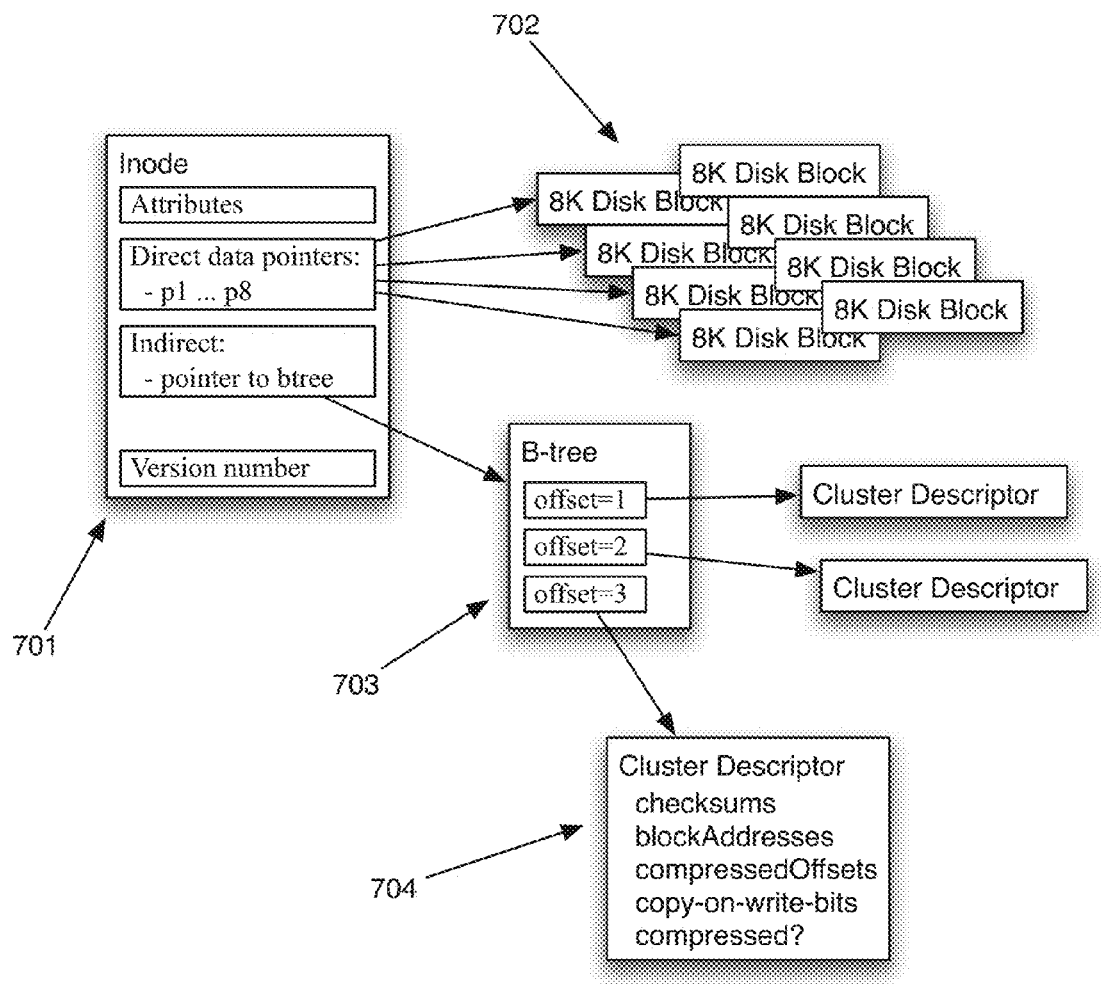
FIG. 7 is a block schematic diagram that shows the structure of an inode representing a local file according to the invention.

FIG. 7 is a block schematic diagram that shows the structure of an inode representing a local file. Here, the inode 701 has the same general structure as the inode pointed to by CLDB 301 in FIG. 3 or as shown in outline in FIG. 6, except that all of the data pointers point to disk blocks 702 and the indirect value points to a b-tree 703 which, in turn, points to cluster descriptors 704.

The cluster descriptors 704 contain pointers to up to eight disk blocks that store up to 64 kB of data. Only as many disk blocks are used as are needed to store the data in the cluster descriptor. If the cluster descriptor contains compressed data, each 8 kB block of the original data is compressed separately and the compressed representations are concatenated byte-wise. The offset to the beginning of each compressed 8 kB block is stored in an array of two-byte integers. The data stored in a single file chunk is restricted to be in the same container as the inode for the file chunk.

A chunked file is a file that is made up of chunks stored in many containers. Each chunk is represented as a local file and references from the chunked file inode lead to an array of references to these local files.

Figure 8:
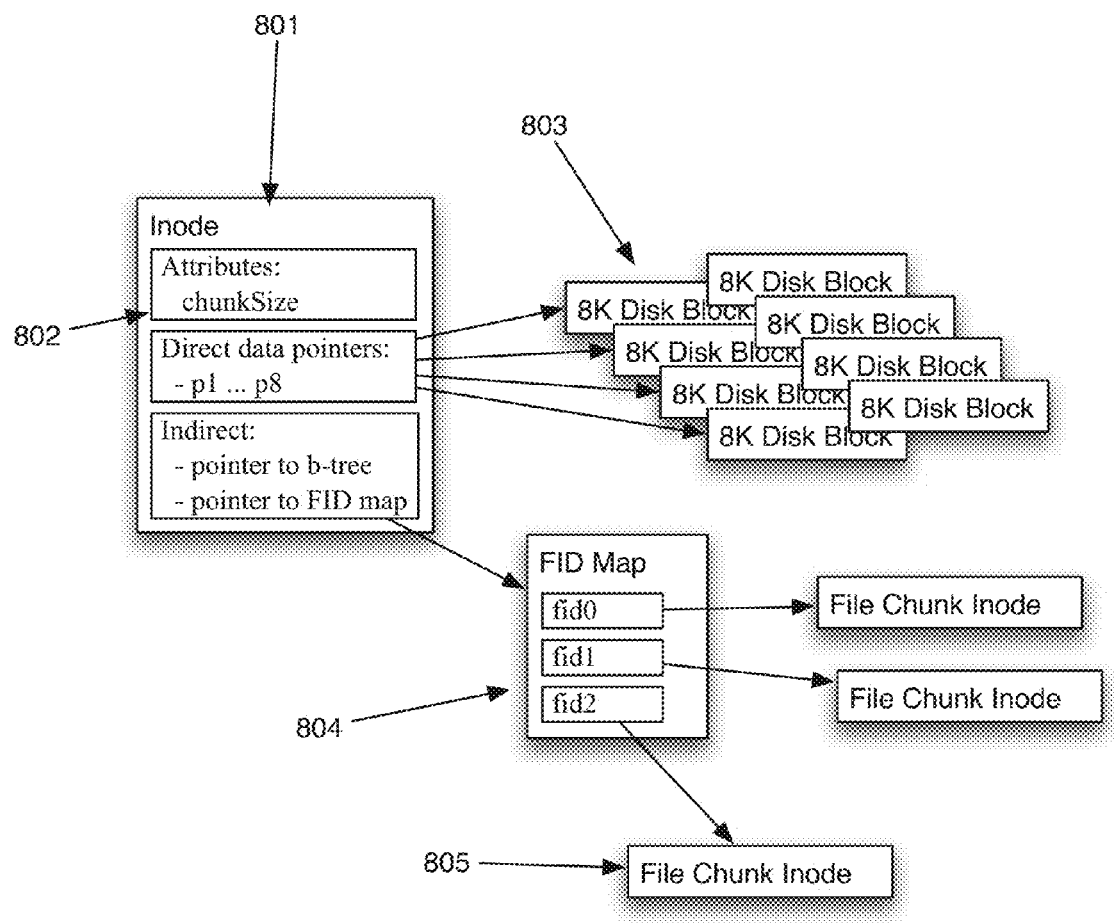
FIG. 8 is a block schematic diagram that shows the structure of a file that contains file chunks according to the invention.

FIG. 8 is a block schematic diagram that shows the structure of a file that contains file chunks. Here, the inode 801 for the chunked file is shown. This inode contains the chunkSize 802 which specifies how much data each filelet contains. For local files, the chunkSize is set to 0; for chunked files, the chunkSize is set to any desired value of 64 k or more. The direct data pointers have references to disk blocks 803 in the same container as the chunked file inode, as seen before with a local file inode 801. The indirect pointer for a file, however, points to local file that contains an array of FID's referred to as the FID map 804 whose elements refer to file chunks that can be in any container anywhere in the cluster. The elements of the FID map are FID's 806 as were shown in FIG. 6.

A symbolic link is stored as a local file that contains the name of a file. Normally, such names are less than 64 kB in length and thus are stored only in the direct blocks of the inode. Symbolic links can be dereferenced relative to the directory containing the link as is typical in other file systems. In the distributed system herein, symbolic links can point to any file system object.

A volume mount is stored as a local file that contains the name of the volume to be mounted. Normally, such names are less than 64 kB in length and thus are stored only in the direct blocks of the inode. Volume mounts are treated as directories when resolving references to file system objects. The volume being mounted is looked up by name and the root directory of the volume is treated as if it were at the volume mount point.

Figure 9:
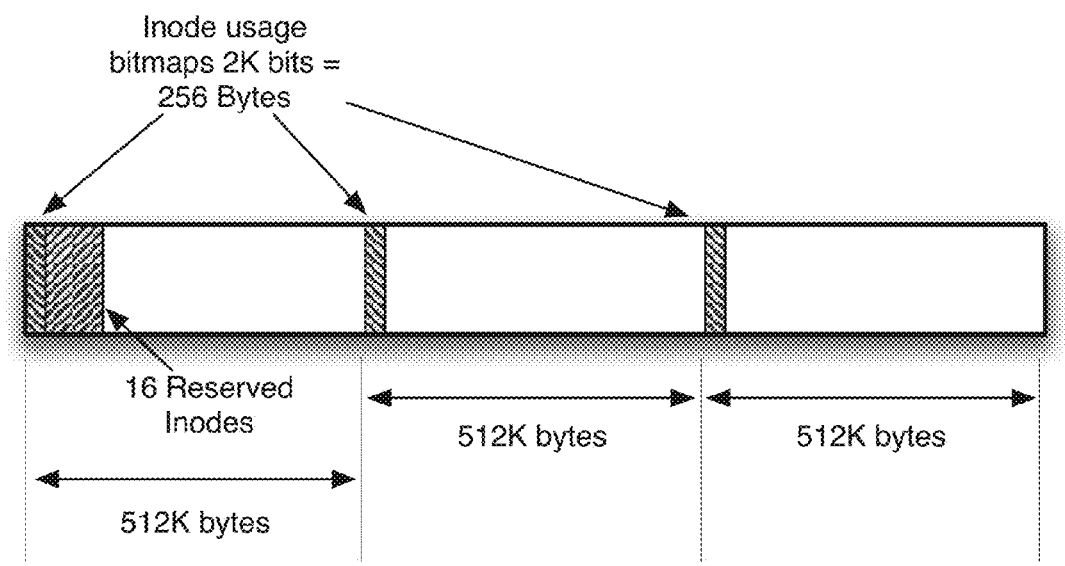
FIG. 9 is a block schematic diagram that shows the contents and layout of an inode file that defines the contents of a container according to the invention.

FIG. 9 is a block schematic diagram that shows the contents and layout of the inode file that defines the contents of a container. The inode for the inode file itself is one of the 16 reserved inodes. The inode file is stored as a local file. All files in the container are defined by a container id and an inode number. The inode number of a file is used to compute an offset in the inode file to find the 256 byte inode structure for the file. Inode numbers that correspond to the bitmap regions of the inode file are not used. The inode file is extended in increments of 512K bytes.

Figure 10:
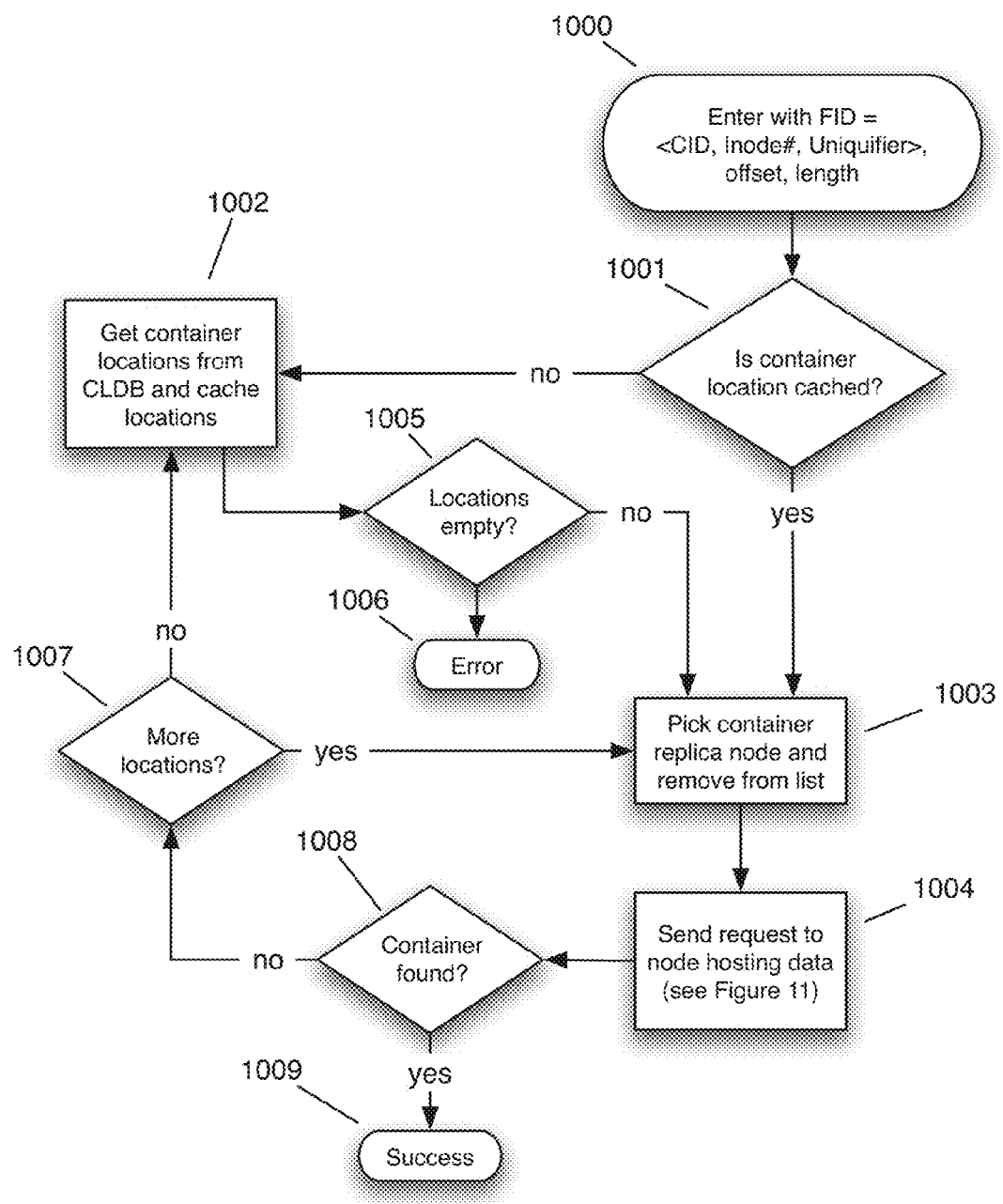
FIG. 10 is a flow chart that shows a client reading data from container replicas according to the invention.

FIG. 10 is a flow chart showing a client reading data from container replicas. In FIG. 10, an FID=<CID, Inode#, Uniquifier>, offset, and length is entered (1000). A determination is made whether the container location is cached (1001). If it is, then the container replication node is picked and removed from the list (1003) and a request is sent to the node that hosts the data (1004; see FIG. 11). If the container is found (1008), then the operation is successful (1009). If not, then more locations are checked if available (1007); else, container locations are retrieved from the CLDB (1002). Container locations retrieved from CLDB are cached on receipt. If the locations are empty (1005), there is an error (1006); else a container replication node is picked and removed from the list (1103) and the process continues as above. Likewise, if the container location is not cached (1001), then container locations are retrieved from the CLDB and cached (1002). If the locations are empty (1005), there is an error (1006); else a container replication node is picked and removed from the list (1103) and the process continues as above.

Figure 11:
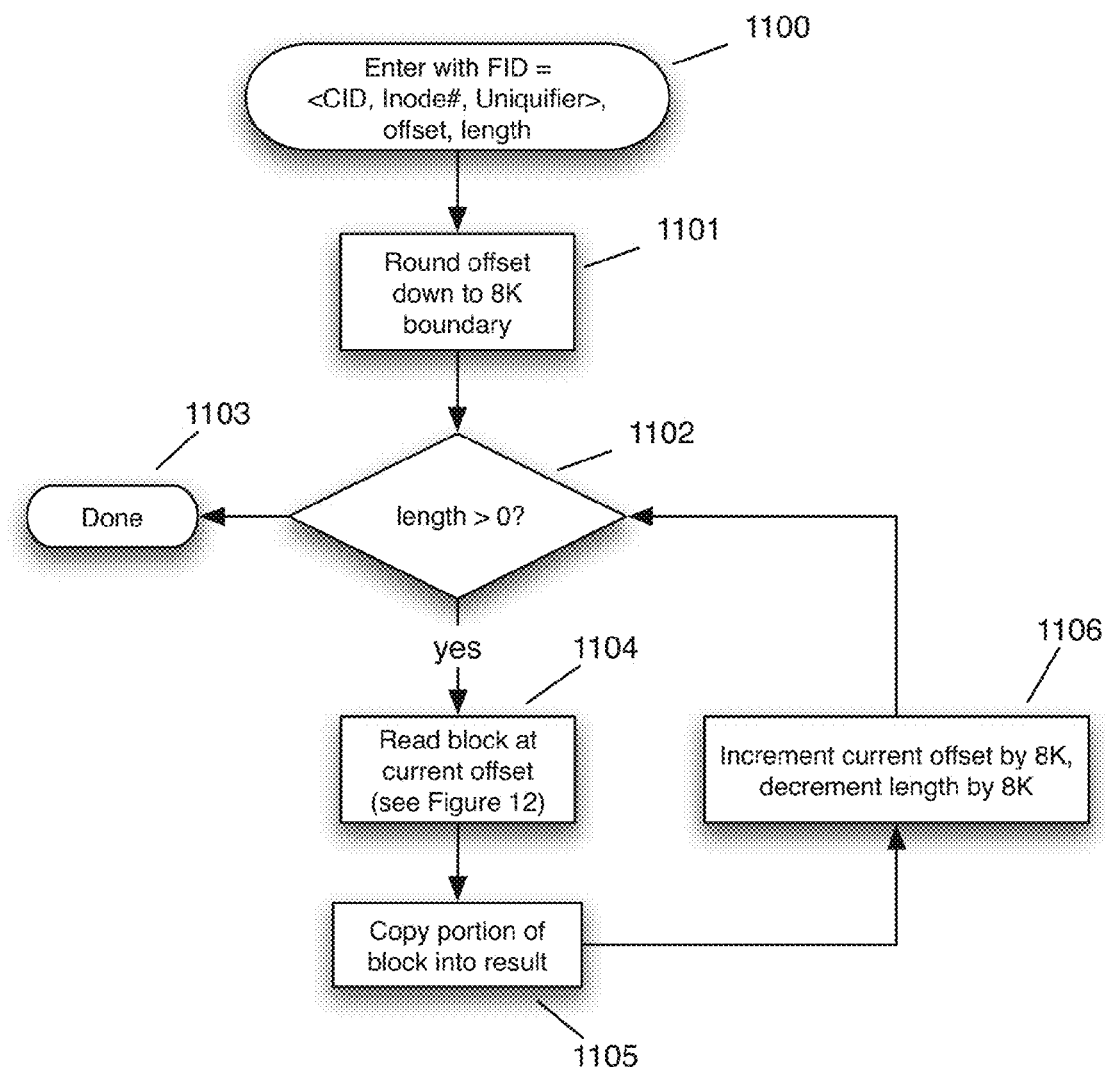
FIG. 11 is a flow chart that shows how a server reads a region of a file by reading blocks according to the invention.

FIG. 11 is a flow chart showing how a server reads a region of a file by reading blocks. The blocks containing bytes in the region are read and the portions in the region of interest are copied into the result. In FIG. 11, an FID=<CID, Inode#, Uniquifier>, offset, and length is entered (1100). The offset is rounded down to the 8 k boundary (1101) and the length is checked to determine if it exceeds 0 (1102). If not, the process is done (1103); else, a block is read at the current offset (1104; see FIG. 12) and a portion of the block is copied into the result (1105). The current offset is then offset by 8 k and the length is decremented by 8 k (1106) and the process repeats.

Figure 12:
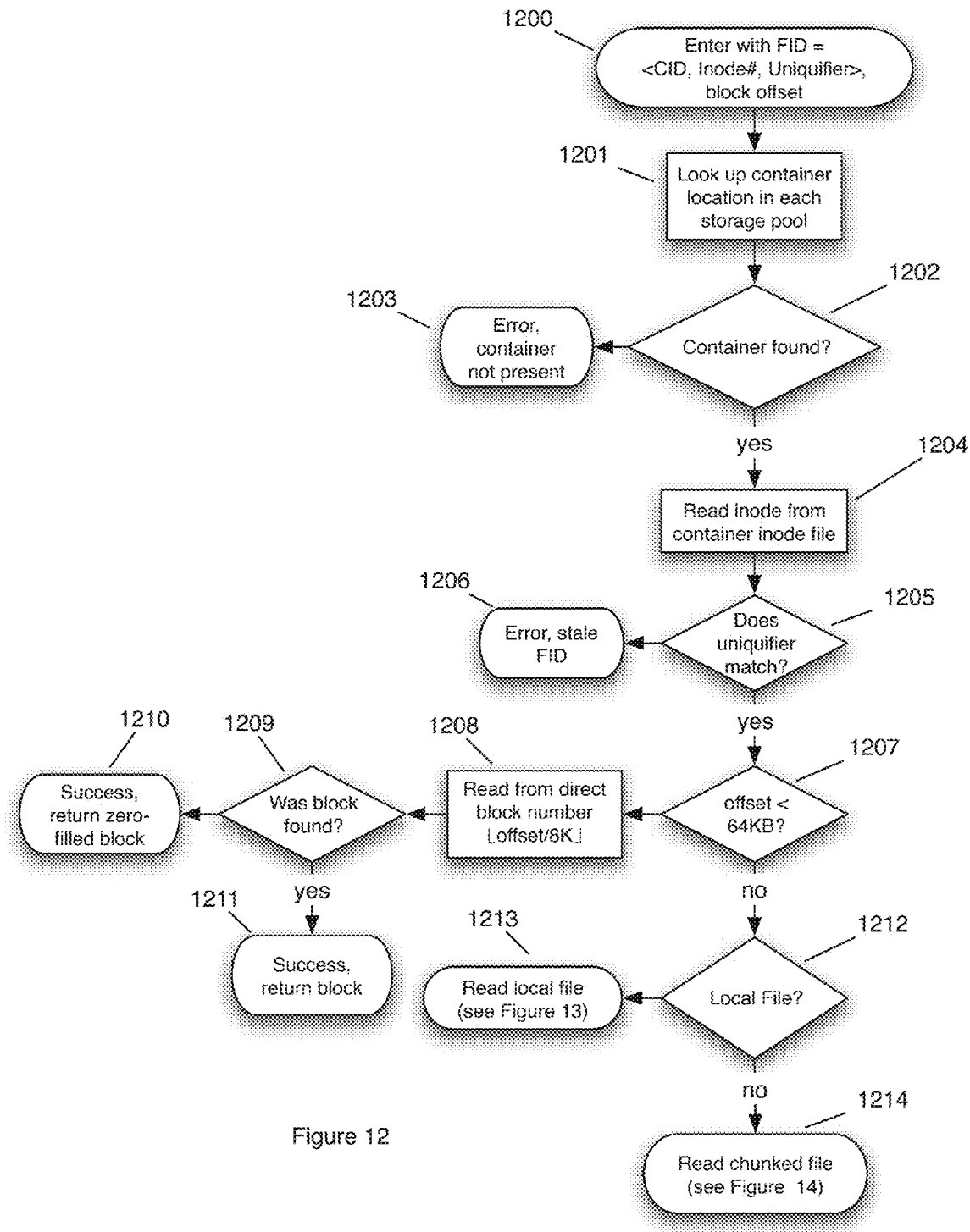
FIG. 12 is a flow chart that shows how a server reads a block from a file according to the invention.

FIG. 12 is a flow chart that shows how a server reads a block from a file. All files allow direct access to the first 64 KB of the file. Access to later blocks are covered in separate flow charts. In FIG. 12, an FID=<CID, Inode#, Uniquifier>, offset, and length is entered (1200). The container location is then looked up in each storage pool (1201). If the container is not found (1202), there is an error and the container is not present (1203); else, the inode is read from the inode file (1204). If the uniquifier does not match (1205), there is an error and a stale FID (1206); else, the offset is tested to determine if it is less than 64 kB (1207). If not, a determination is made if the file is a local file (1212). If it is, then the file is read (1213; see FIG. 13); else, the chunked file is read (1214; see FIG. 14). If the offset is less than 64 kB (1207), a read is made from the direct block number [offset/8 k] (1208). If the block is found (1209), the operation is successful and the block is returned (1211); else, the operation is also considered successful, but a zero filled block is returned (1210).

Figure 13:
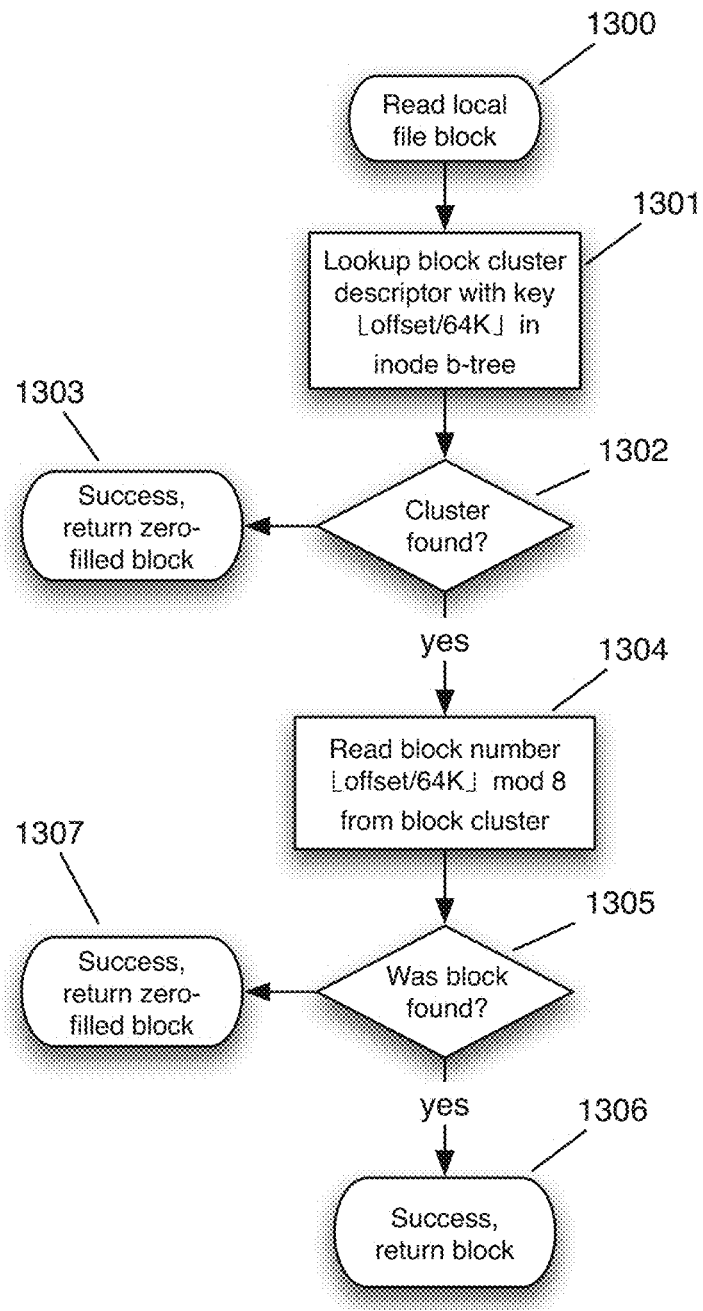
FIG. 13 is a flow chart that shows how a server reads a block from a local file according to the invention.

FIG. 13 is a flow chart that shows how a server reads a block from a local file. Blocks after the first 64K bytes are read by looking in a b-tree keyed by offset to find the address of the correct block cluster. Each block cluster consists of eight separate 8K byte blocks. In FIG. 13, a local file block is read (1300). The mode b-tree (1301) is searched with a key equal to [offset/64 k] to find the block cluster descriptor. If the cluster is not found (1302), the operation is deemed successful and a zero-filled block is returned (1303); else, the block identified by block number [offset/64 k] mod 8 is read from the block cluster (1304). If the block is found (1305) the operation is successful and the block is returned (1306); else the operation is deemed successful and a zero-filled block is returned (1307).

Figure 14:
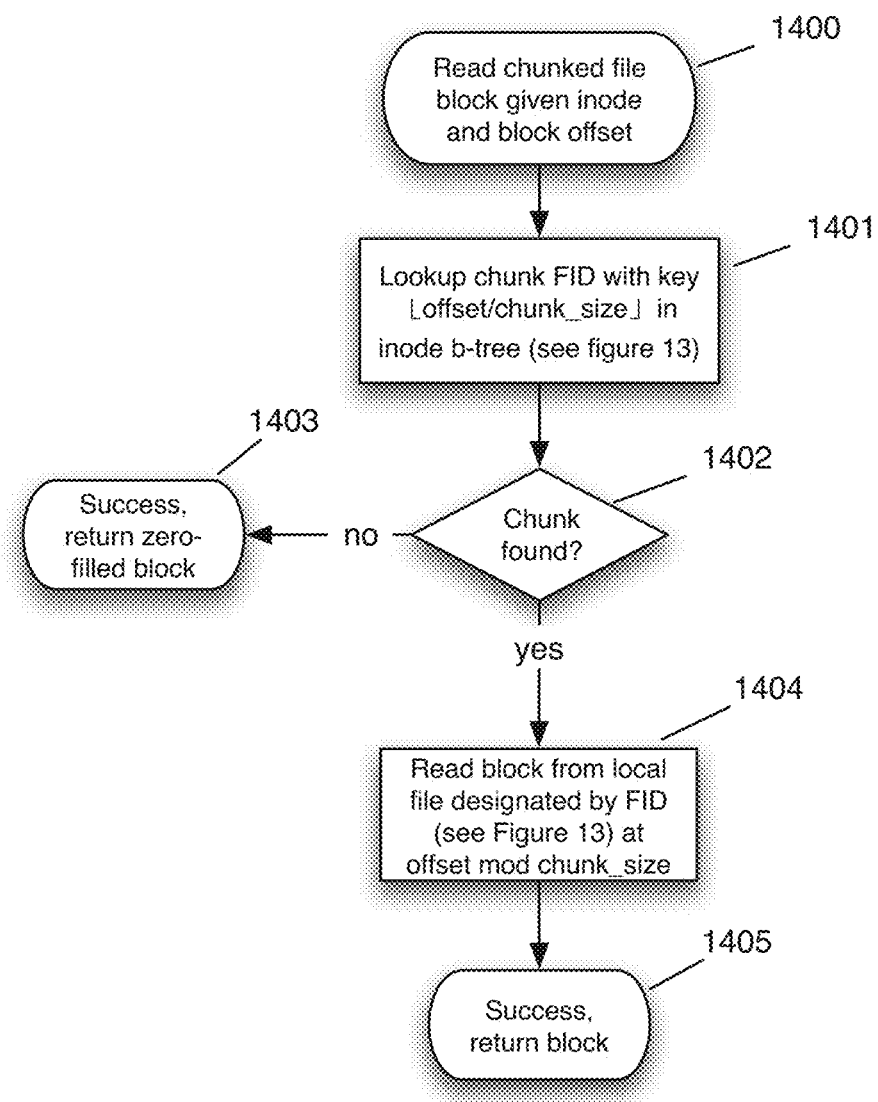
FIG. 14 is a flowchart that shows how a server reads a block from a chunked file according to the invention.

FIG. 14 is a flowchart that shows how a server reads a block from a chunked file. Blocks after the first 64K bytes are read by finding the FID in an array of FID's known as the FID table that is stored in a local file. The index of the FID in the FID table is determined by dividing the desired block offset by the size of the chunks in the chunked file and rounding down to the next lower integer. See FIG. 13 for details on how to read from a local file. Each chunk consists of a piece of the chunked file that has chunk_size bytes. The chunk_size parameter is defined in the inode of the chunked file. Reading a block from the chunk is delegated to the normal methods for reading a block from a local file. In FIG. 14, the chunked file block is read, given the inode and block offset (1400). The chunk FID is looked up in the FID map using an index of offset/chunk_sizef (1401; see FIG. 13). If the chunk is not found (1402), the operation is deemed successful and a zero-filled block is returned (1403); else the block designated by the FID is read from the local file at offset mode chunk_size (1404; see FIG. 12), and the operation is deemed successful with the desired block being returned (1405).

Transactional Replication of Containers

To avoid data loss, the content of containers is replicated. Changes to the content of a container must be propagated to the replicas of the container. To facilitate the accuracy of replication, containers are arranged so that one replica is distinguished as the container master. Updates to a container are sent to the master for the updated container and the master propagates the changes to the other replicas. This propagation can be arranged in a linear or a star pattern, or any combination of these patterns.

Figure 19:
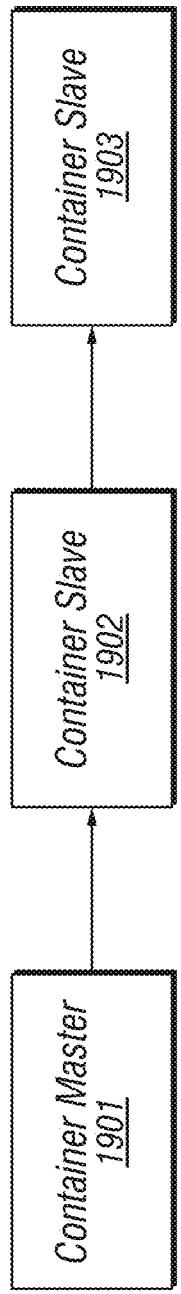
FIG. 19 is a block schematic diagram showing linear replication according to the invention.

A linear replication is shown in FIG. 19, in which the node holding the master replica of a container 1901 propagates updates to a first slave node that contains another replica 1902. This first slave node, in turn, propagates updates to a second slave node 1903 that contains a third replica of the container.

Figure 20:
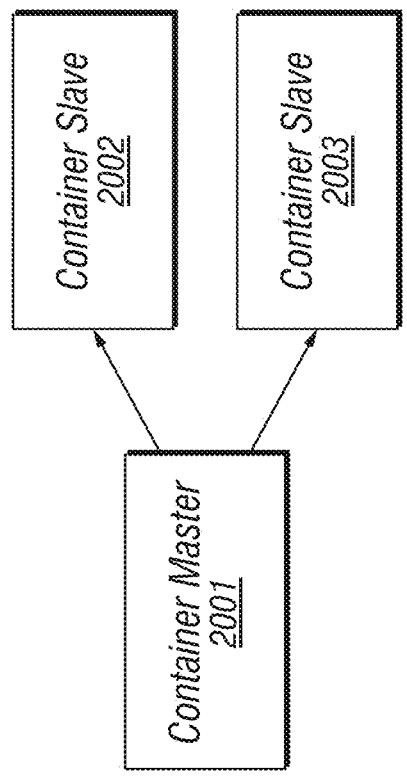
FIG. 20 is a block schematic diagram showing a star replication pattern according to the invention.

A star replication pattern is shown in FIG. 20 in which the node containing the master copy of a container 2001 propagates updates directly to all other nodes 2002 and 2003 containing replicas of the container. In the star configuration, updates can be propagated to all replicas simultaneously, possibly leading to faster updates. In the linear configuration, updates may propagate with long latency, but the network bandwidth required to propagate the updates from the master replica is less than with the star configuration.

When an update is received by a node containing a replica of a container, a lock is taken on the particular portion of the file being updated to guarantee that updates that change the same portion of a file are transactionally serialized. This guarantees that updates are made consistently on all replicas of the container. As is well known in the art, lock region narrowing can be used to decrease the number of locks required to implement this serialization.

Furthermore, to increase the amount of parallelism available in updates the number of update transactions that are allowed to be pending for a single file is limited. Without this limit, a single client could queue up enough updates to clog other updates. With this limit, the bandwidth attainable by any single client is slightly limited, but the parallelism achievable by a large number of clients is much higher.

Updates to containers are acknowledged once enough of the nodes containing replicas have acknowledged that they have received the update. Multiple updates can be pending at the same time to increase potential parallelism, but all updates to a container are assigned a serial update identifier by the container master. Updates may be applied on different replicas in different orders, but only updates that have been acknowledged by all replicas are reported back to the client as committed. Moreover, before reporting an update as completed, all updates with smaller update identifiers also must be completed. This practice results in updates being committed in batches in a form of group-commit, and also guarantees that the set of all transactions committed while a particular replica serves as master have consecutive update identifiers.

The content location database (CLDB) stores the location of all replicas of a container and the structure of the replication for the container. In addition, the CLDB stores an epoch number for each container. This epoch number is incremented each time the replication structure for a container is changed.

The replication structure for a container can be changed if the node holding any replica fails or is taken out of service or if a node that previously contained a replica returns to service. There are four situations to be considered. The first situation occurs when a node containing an out-of-date replica joins an existing replica chain. The second situation occurs when non-empty sets of nodes containing replicas of a container fail and the set of failing nodes includes the node containing the master replica. The third situation occurs when the set of failing nodes does not include the node containing the master replica. The fourth situation occurs when a number of nodes containing replicas of a container come into service at roughly the same time.

In the first situation, the node containing the out-of-date replica contacts the CLDB. The CLDB may decide that enough replicas are already known, in which case the node is instructed to discard the replica. The CLDB may also assign the out-of-date replica to the replication structure. At that point, the resynchronization process described below is executed to bring the out-of-date container up to the current state.

In the second case, the CLDB detects the loss of contact with the failing nodes and notices that the failing nodes contain the previous master. In response, a surviving node containing a replica, if any such exists, is designated the new master and other nodes are assigned positions in the replication structure. The epoch number for the container is incremented at the same time that the new master is designated. In addition, the new master increments the transaction identifier to guarantee that a gap occurs in the sequence of transaction identifiers. The new master then records the end of the set of transactions that were handled by the previous master in the previous epoch and records the starting point for transaction identifiers in this new epoch. At this point, this situation is reduced to the first case by considering all other replicas to be out-of-date.

In the third case, the failing nodes are simply removed from the replication structure, but the master survives. Depending on the severity of the loss and time since it occurred, new replicas may be recruited from other nodes in the cluster. Also, the failing nodes may return after a short period of time. In either case, this reduces to the first situation.

In the fourth case, nodes contact the CLDB as they come up and report the last epoch that they have seen, as well as the last update identifier that they have recorded. Until a configurable minimum number of nodes comes up, no updates are allowed and a master is not designated, although read operations may be allowed. Once a minimum number of nodes have reported to the CLDB and a configurable delay has passed to allow any slow nodes to reappear, the CLDB selects one of the nodes as master and arranges the others in a replication structure. The node selected as master is the node that reports that it has seen the most recent epoch and transaction identifier. At this point, the situation reduces to the first case of out-of-date replicas joining a replication structure.

Thus, all reasonable failure scenarios ultimately reduce to the case of potentially out-of-date replicas being resynchronized to the current state of the master replica of a container.

It should be clear to one versed in the art that the replication structures for different containers need not bear any similarity to each other and that they can be arranged in any combination. In particular, the master replica of one container might be on the same node as a slave replica of another container.

Container Snapshots

Making a snapshot of a container simply requires copying the container data structure and setting the copy on write bit to 1. This copy will itself be a new container. For simplicity, it is convenient to lock the container for updates during the copy since the copy only involves the top-level data structure, which is relatively small. The copy needs to occur on all nodes that hold the container being copied and the duplicate container data structures need to live in the same storage pool as the original container data structures.

In a normal snapshot of a container, the new copy of the container is marked as read-only and the copy-on-write bit in the original container data structure is set to 1. The reverse operation is also possible and if the new copy has the copy-on-write bit set to 1 and the original container is marked as read-only, then the snapshot operation is referred to as a clone rather than a snapshot. Clones are used in the resynchronization process. Clones can effectively be converted into snapshots and vice versa by changing the container identifier to inode mapping on each of the storage pools hosting replicas of the container to swap the identifiers on the original container and the copy.

As described in the section on volume snapshots, a container identifier remapping table may be injected into the container copies. If this is done, all references to containers are remapped to point to the container indicated in the remapping table. This makes it so that a snapshot volume refers only to snapshot containers even though the data containing the references is not changed.

Container Resynchronization

In the event of a node failure, it is typical for the recovery to be reduced quickly to the problem of re-inserting an out-of-date container replica into the replication chain. All of the failure scenarios described in the section on transactional container updates reduce to this case. Container resynchronization is the process whereby containers are brought up to date with the master replica of the container before being inserted into the replication chain.

This resynchronization is not trivial. At any given time, there can be thousands of transactions in flight for any container and different replicas of a container may have applied transactions in a different order. If the master node for that container fails, the replicas of that container may have divergent states based on applying different sets of transactions. After a new master is designated, the system is left with the problem of bringing the other replicas into a common state while still accepting new updates.

The goal of container resynchronization, then, is to take a master copy of a container and a target copy and to cause the target copy to be identical to the master copy. This process is complicated by the fact that the master may continually be receiving updates. Because the target is by definition not part of any replication structure, it is not receiving any updates.

The process of resynchronization starts by taking a snapshot of the master copy and making a clone of the target. In broad terms, the process then proceeds by reverting the target clone back to a common ancestor state (a process known as rollback) and then updating the target clone with blocks from the master snapshot that have changed since the common ancestor version (a process known as roll forward). At this point, the entries for the target and the target clone in the container table on the node holding the target are swapped and the original version of the target is discarded. This process is repeated until the target is close to the master and then a final cleanup copy is done while holding a lock on the master copy.

Container Rollback

When examining the master and target copies of the same container, it is possible to trace back through the transactions that have been applied to each copy to determine a point in the history of the two containers when they were identical. This is possible because epoch's changes are noted in the transaction history for each version of the container and gaps are inserted whenever the master is noted in a replication chain. As an economy, the fact that all committed transactions involve consecutive transaction identifiers allows the set of committed transactions to be run-length encoded and the on-disk state can be updated only when a new epoch is begun as a new master is designated. This means that transactions can be identified by the epoch in which they were performed, as well as by a transaction counter in the container.

To bring the target container up to date relative to the master container, it is necessary to undo any changes made to the secondary version of the container because it was identical to the master. These changes must be undone because the changes on the target may not all have been applied to the master.

Once the common ancestor transaction is identified, the secondary version of the container can be scanned to find all blocks that have been modified since the common ancestor transaction. As these blocks are found, the target over-writes them by requesting these same blocks from the master. This process leaves all blocks in the target container either in the state that they had as of the common ancestor state or in a later state present on the master version of the container. Because the next step is to update all blocks to the current state of the master version of the container, the fact that some of the target container blocks may not be in the state as of the common ancestor transaction is not a problem.

Likewise, because the target cannot be accessed via the file system, the fact that it may temporarily be in an inconsistent state does not matter.

Container Roll Forward

After the target has been brought back to the common ancestor state, the master can be scanned to find all blocks that have been updated since the common ancestor transaction. These blocks are then copied to the target copy of the container.

During this update process, the snapshot of the master container that is used as a source of blocks is stable, but updates are typically still being made to the original container. To address this, the snapshot and update process is repeated until the target copy is less than a configurable number of transactions behind the master copy.

Once the secondary copy of the container is close enough to the master, updates to the master are frozen while a final update is done to the secondary. At this point, the secondary copy of the container is an exact copy of the master and normal transactional updates can proceed by inserting the secondary copy into the replication chain from the master. As was mentioned above, this final phase can be invoked if the target does not catch up within a limited number of roll forward steps.

When the copy process converges, the container identifier table in the storage pool containing the target is modified to swap the identifiers for the target container and the clone of the target container that was used for the copy operation. The original container can then be discarded. This swap and discard has the effect of making any references to the old container continue to work.

Distributed Transactions

Simple container replication is insufficient for the distributed file system because a first-class map-reduce system requires that some files be larger than a single container and also that files be spread over a larger number of nodes than the set represented by the replication chain of a single container. Chunked files in the distributed file system are used to satisfy this need, but supporting full atomic updates or appends on a chunked file requires multi-container transactions. In the simplest case, a file chunk and the original inode must be updated in a coordinated fashion. In more complex cases, the original inode and multiple file chunks must be updated together.

There are multiple existing approaches to distributed multi-node transactions, but all prior art systems have severe deficiencies in distributed settings. For example, Zookeeper handles transactions by requiring that all transactions go through a single master, by insisting that there always be a quorum of the cluster to designate a master, and that all updates be committed using two-phase commit accepted by a quorum of nodes. The quorum consists of more than half of the machines in the cluster so that it is possible to show that there is a continuous chain of custody of transaction information over time and that a quorum can never be created that does not have the latest information. This approach has two problems. First, it is not possible to operate if less than a quorum of nodes are still available, and secondly all updates have to go through the master node and it is not possible to have more than one master without violating the assumptions of the cluster. These trade-offs give Zookeeper good reliability guarantees, but make it non-scalable and brittle with respect to accepting updates when less than a quorum is available.

Figure 15:
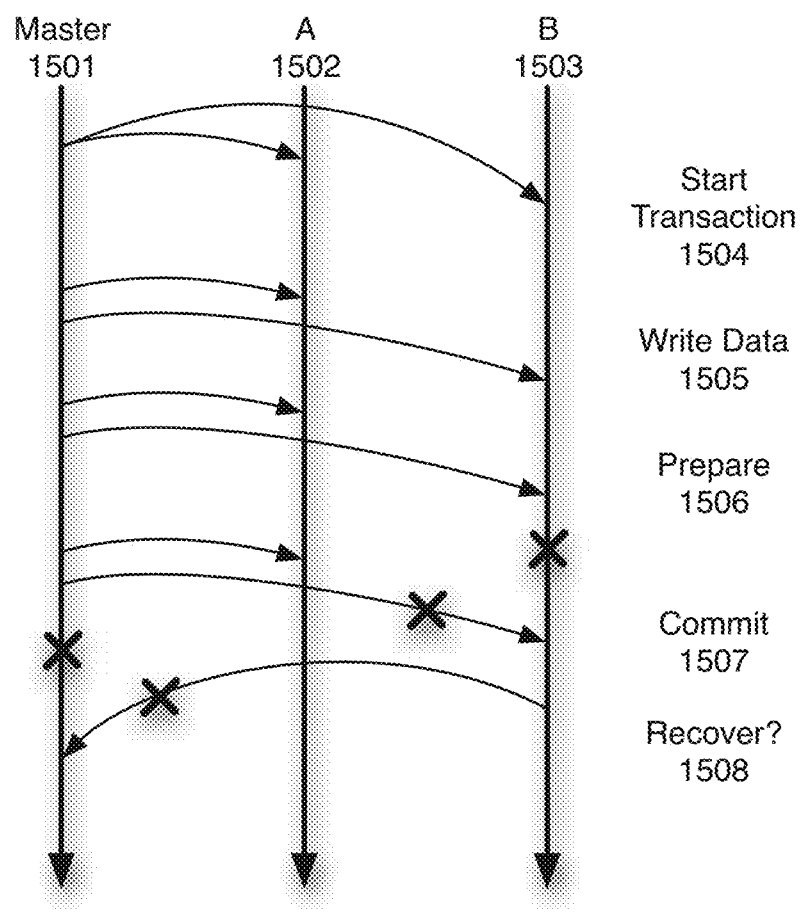
FIG. 15 is a flow diagram that shows a transaction that cannot be recovered.

Traditional distributed two-phase commit systems also have problems providing reliable operation in the face of multiple failures. FIG. 15 is a flow diagram that shows a transaction that cannot be recovered during interactions between three nodes, the transaction master 1501 and subsidiary nodes 1502 and 1503. Exactly which node is master and which are subsidiary can change from transaction to transaction and the operations performed on the subsidiary nodes may themselves involve distributed transactions without affecting the generality of the discussion here. The first step is for the master to send a start transaction 1504 to the subsidiary nodes. At this point all modifications to data under the aegis of that transaction involve taking locks 1505 on that data. Eventually, the master decides to start committing (or rolling back) the transaction and it sends a prepare command 1506 to the subsidiary nodes. At that point in this example, all involved nodes must promise to retain all locks until the transaction is committed successfully or rolled back. In this scenario, however, the commit 1507 sent from the master reaches node A 1502, but is prevented from reaching the node B 1503 due to a node failure or network partition. Node B commits the transaction and prunes its transaction logs. The master, however, must wait for confirmation from C that the commit has completed that cannot now arrive. If the master now fails and node C returns, node C is not able to discover 1508 the state of the transaction from the master and is stuck in limbo because it cannot know whether to commit or abort the transaction. It cannot abort the transaction and it cannot commit it without knowledge that only the master has. Thus, node C must retain all logs and locks relevant to this transaction, possibly forever because the master may never come back.

Figure 16:
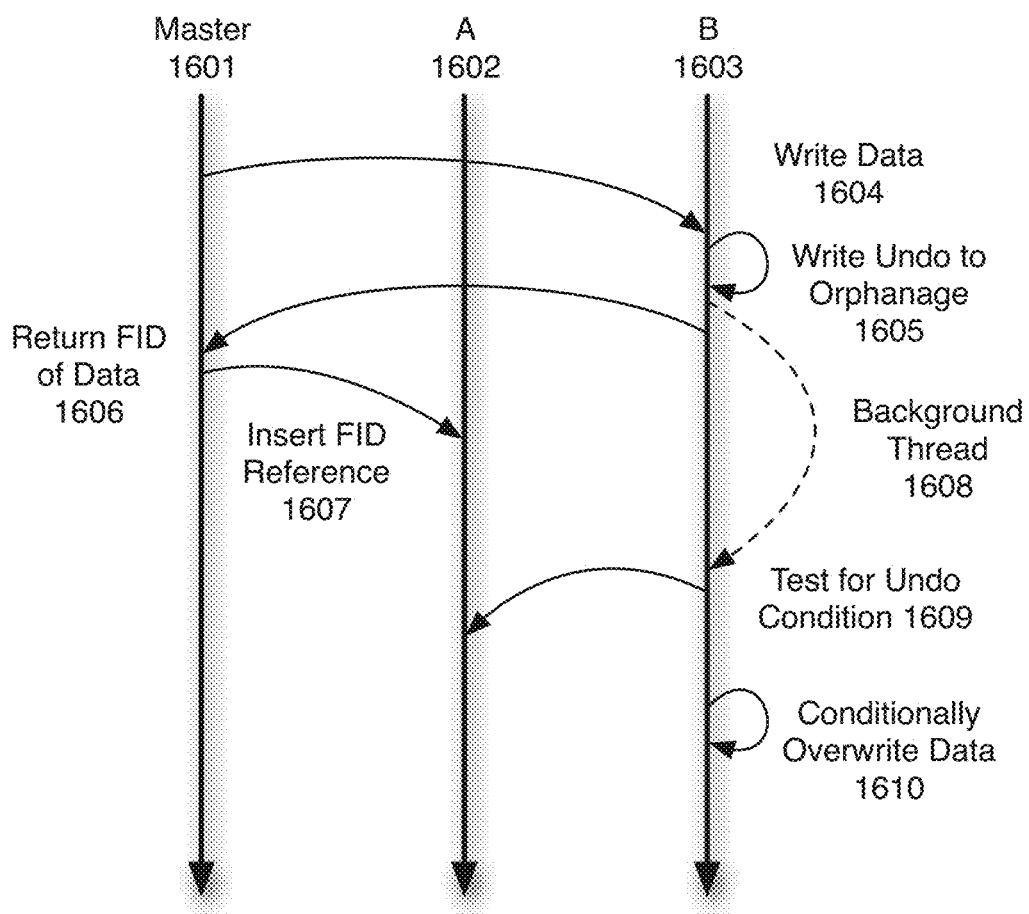
FIG. 16 is a flow diagram that shows a transaction that is unaffected by failures according to the invention.

FIG. 16 is a flow diagram that shows of a transaction that is unaffected by failures. In FIG. 16, a master node 1601 intends to write a reference on subsidiary node A 1602 to new data on subsidiary B 1603. Soon after the operation, either the reference on A and the data on B should exist or neither the reference on A nor the data on B should exist regardless of transient or permanent failures or partitions of the nodes involved. In some implementations or situations subsidiary node A or B or both might be the same node as the master node without loss of generality. Likewise, the outline presented here might involve more subsidiary nodes than described here as long as the subsidiary nodes can be divided into a set of nodes where references to data on another disjoint set of nodes resides. Without loss of generality, we can describe the case where the master 1601, node A 1602, and node B 1603 are single nodes. A practitioner versed in the art will be able to interpret this limited description in a more general fashion.

The way that this transaction is performed is that master node 1601 first writes data 1604 to subsidiary node B 1603. The data is written on subsidiary node B to a transaction log and a transaction 1605 is written into the orphanage that reverses the effect of the write if the reference on subsidiary node A is not found at a later time. The updates to the transaction log and to the orphanage are done atomically. Subsidiary node B 1603 then returns a reference 1606 to the newly written data to the master node. This reference is then sent 1607 to subsidiary node A 1602. When the data was created on node B, a background thread was started or a cleanup event was scheduled 1608 that causes node B to inspect the orphanage at a time substantially after the original write occurs. The orphanage entry cause node B to inspect 1609 node A or one of the replicas of node A to see if the reference to the data written on node B exists. If the reference does exist, then no action is taken. If the reference does not exist, the orphanage entry created in transaction 1605 on B is executed which reverses the effect of the original writing of the data 1604. If the reference on node A is never created, then the new data on node B is never accessible so the effect is that the reference and the data appear atomically or not at all.

Failures can occur at any point in this process without the invariants of the transaction being violated. A failure before the original writes 1604 and 1605 prevents the master node from receiving the reference to the new data and does not result in any change of data on node B and thus does not cause any change or reference. A failure after the writes 1604 and 1605, but before returning 1606 the reference, prevents the reference from being inserted on node A, but the orphanage eventually causes the data write to be undone. A failure of the master node after receiving the reference, but before sending 1607 it to node A or a failure of node A before persisting the reference, is also eventually cleaned up by the background thread 1608. Failures of node A after the reference is written is handled because the background thread 1608 finds the reference on one of node A's replicas. If all replicas have been lost by failure of node A and all node A replicas, then the data is removed. If node B fails before the background thread is invoked, the other nodes in the replication chain execute the cleanup task.

One reason that this form of transaction works for the distributed file system is that all distributed updates to the file system can be topologically sorted according to dependency so that any partial updates does not cause a user-visible change to the state of the file-system. In many cases, dividing the nodes involved in a transaction into a bipartite set with some nodes that have new references to new data and other nodes that have the new data trivially satisfies this topological sort requirement. This topological sort criterion is not true in the general case of, say, relational database updates because the dependencies are not always even clear because they often are based on external semantic constraints. This means that the distributed file system distributed transaction is, in some sense, weaker than a traditional two-phase commit. On the other hand, the required set of operations is also more limited which allows the distributed file system to use this novel form of distributed transaction.

Distributed Volume Snapshots

One particularly important form of distributed transaction is the creation of a snapshot of a file system volume consisting of directories and files spread over a number of containers. This is difficult in a conventional file system and is typically implemented by avoiding distributed updates (as with AFS) or by using a centralized locking protocol (as with GFS). Lack of replication results in a system that is subject to single point failure and low performance in large clusters. Centralized locking protocols limit performance, especially for high rates of file creation and can make distributed snapshots very difficult on an active file system without severely impacting performance. In the herein disclosed distributed file system, distributed transactions and container snapshots are used to implement distributed snapshots without significantly impacting performance or requiring the locking of large distributed data structures.

The way that the distributed file system implements distributed snapshots is to organize all data and meta-data for a volume into a single name container and zero or more data containers. In addition, the system segregates all cross-container references to data into the name container while keeping all of the data in data containers. This system can be generalized to use more than one name container using standard techniques known to one skilled in the art.

Because all references from one data container to another data container are mediated by data structures in the name volume, a volume snapshot can proceed by first creating a snapshot of the name container and then creating snapshots of the data containers. Data structures that are inserted into the data containers can only have references to them from data structures that name the container, and those references must be created before or after the name container snapshot. If the reference exists in the name container snapshot, then the data must have existed at an earlier time and thus any data container snapshot taken after the name container snapshot has the data preventing any dangling references. To avoid confusion about which containers to include in the snapshot, the container location database can lock out the addition of new containers for a volume during the creation of the snapshot. As an alternative, the name container can contain the necessary references to the data containers, which means that once the name container has been snapshotted, the set of data containers that need to be snapshotted is frozen.

Figure 17:
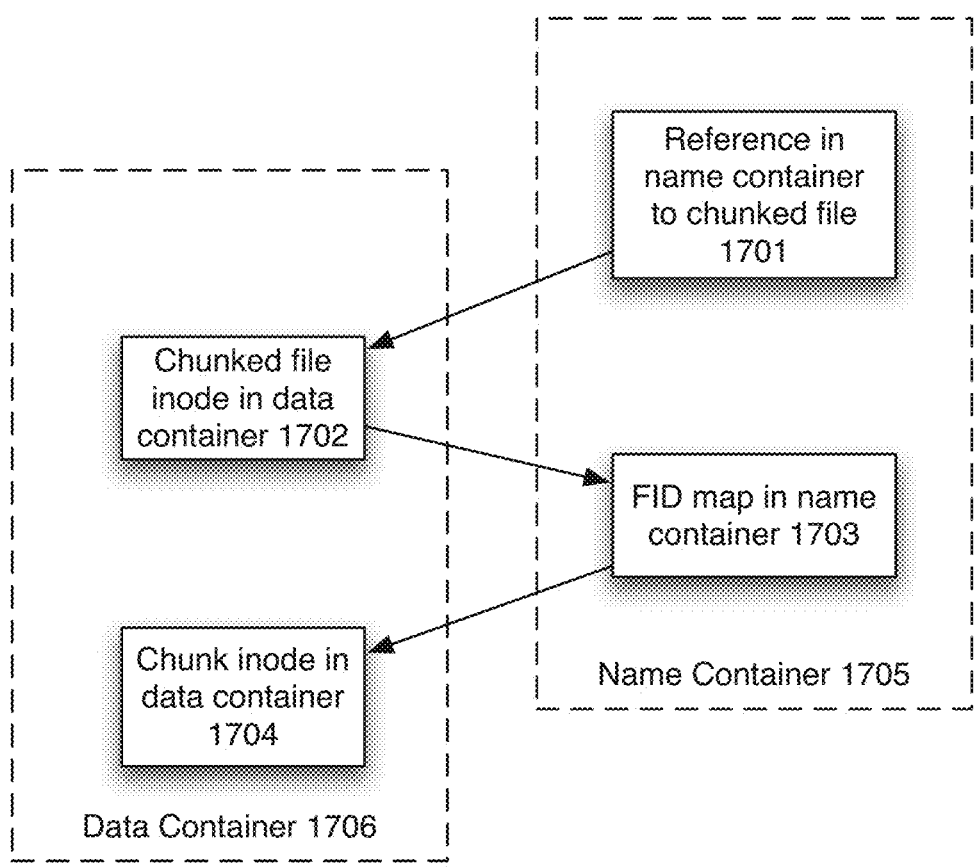
FIG. 17 is a block schematic diagram that shows the structure of references for chunked file according to the invention.

FIG. 17 is a block schematic diagram that shows the structure of references for chunked file. In FIG. 17, the final state of a directory entry 1701 that points to the inode 1702 describing a chunked file. The inode 1702 for the chunked file refers to a FID map 1703. The FID map 1703 has a reference to a local file 1704 that actually contains the file data. The directory entry 1701 and the FID map 1703 reside in the name container 1705. The inode 1702 and the local file 1704 reside in one or more data containers 1706. Referential integrity in the overall volume snapshot is guaranteed if all references transitively accessible from the volume directory root or other search roots in the name container snapshot must have valid targets.

Because distributed transactions in the distributed system guarantee that the target of a reference exists before the reference is persisted, the worst that can happen is that a snapshots contain data structures that cannot be transitively accessed since there is no direct or indirect reference to them from the volume root directory. In FIG. 17, for example, the reference from the FID map 1703 to the local file 1704 can only exist if the local file 1704 already exists. Because the name container snapshot is created before the data container snapshot, the reference either does not exist in the name container snapshot or else both the reference exists in the name container snapshot and the local file exists in the data container snapshot.

Similarly, the distributed transaction that creates the chunked file inode 1702 guarantees that the FID map 1703 in the name container existed first, and the transaction that creates the directory references 1701 to the chunked file inode guarantees that the directory reference 1701 only exists if the chunked file inode already exists. This transitively implies that the FID map exists before the directory reference 1701 to the chunked file inode 1702 is created. Thus, if the FID map 1703 is not in the name container snapshot, then directory reference 1701 also cannot be in the name container snapshot and any potential referential integrity violation due to the existence of the chunked file inode 1702 is hidden from view.

One skilled in the art can derive similar chains of logic for all referential chains in the distributed file system. In particular, a name container may refer to many daughter name-containers, with the same restraints that the meta data in the daughter name-containers be created before they are made visible in the parent name-container. A distributed directory inside a single volume is thereby built using a hierarchy of name-containers, and they are all consistent both transactionally, as well as when being snapshotted in a distributed manner.

Once snapshots of all of the containers in a volume have been created, a table is created that maps the identifiers of the original containers to the identifiers of the corresponding snapshots. This table is then injected into at least the name container snapshot and potentially into all of the snapshot containers. This table is required because the snapshot containers refer to the same data as the original containers and that common data has references to the original containers. To avoid having to search for these references when rewriting all of them, the mapping table is used to translate references to any of the original containers into references to the corresponding snapshot container. As modifications are made to data in the original volume, changed disk blocks are written to fresh storage and the modified data structures are copied to new locations because the copy on write bit is set. This leaves the data in the snapshot intact. Moreover, all container references continue to refer to the snapshotted version of the data in the volume when mediated by the container lookup table.

NFS Gateway

The distributed file system provides read-write access without requiring that lock tokens or other state-based mechanisms. This means that random updates and reads can occur from any node in the cluster or any machine that has unfettered access to machines in the cluster.

Figure 18:
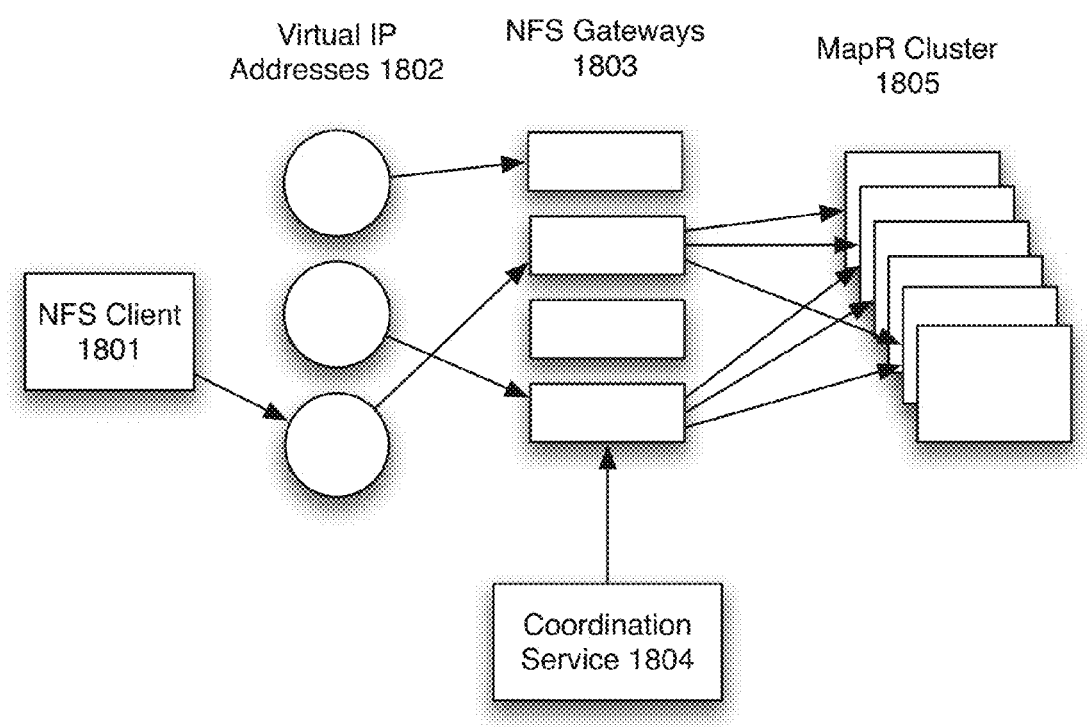
FIG. 18 is a block schematic diagram that shows operation of NFS gateways for a cluster according to the invention.

The stateless nature of access to a distributed file system means that it is relatively easy to provide access to a distributed file system via network protocols, such as NFS. FIG. 18 is a block schematic diagram that shows operation of NFS gateways for a cluster. In this system, an NFS client 1801 connects to a randomly selected virtual IP address 1802. Each virtual IP address 1802 is hosted by one of the NFS gateways 1803 so that connecting to the virtual IP address actually causes the connection to be made to one of the NFS gateways. The NFS gateways cooperatively decide which gateways host which IP addresses by using a coordination server 1804. The coordination service is implemented in one embodiment using a system, such as Apache Zookeeper. Use of such a coordination service can allow reliable assignment of each virtual IP address to a single gateway and ensure that each gateway services as few virtual IP addresses as possible. In response to NFS requests to create files, access file meta-data or to read or update regions of files, the NFS gateways make similar requests to the distributed file system hosted by the cluster 1805. The NFS gateways can be hosted on machines separate from the cluster, or on machines that are part of the cluster.

Because all NFS servers can access all files in the distributed file system, the NFS gateways can be made completely stateless. This means that if one NFS gateway fails, the virtual IP address that was being used by that gateway can be reassigned to another gateway and operations can be retried with no loss. Other than a delay while the loss of the failed gateway is detected and the virtual IP is reassigned, the NFS client cannot even detect the failure. Such failure tolerance can be difficult to provide with systems that maintain locks in the NFS gateways because transferring these locks to another NFS gateway can be difficult or expensive.

Such a system can provide uniform NFS access to a distributed file system. Several benefits accrue as a result of the combination of the distributed file system with NFS gateways. One benefit is that aggregate file read or write bandwidth can scale with the number of NFS gateways up to the limit imposed by the size of the cluster. Likewise, aggregate file create or delete rates scale similarly.

Another benefit concerns the convention for naming files in a cluster. All file names accessed via the distributed file system API start with, for example, the prefix /mapr/ which is followed by the cluster name, a slash, and the name of the file within that cluster. The NFS gateways know about all of the clusters accessible to them so they can populate the top-level /mapr virtual directory with virtual files corresponding to each accessible cluster. Each NFS gateway exports these virtual cluster directories under the /mapr file system. If the NFS file system is mounted by the NFS client on the local file system on the directory /mapr, then programs executing locally on the NFS client machine can use exactly the same path names as Hadoop programs running in the cluster use.

This substantially simplifies programs and scripts that combine conventional sequential elements with map-reduce based elements.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A map-reduce compatible distributed file system comprising replicated containers preventing data loss comprising:
   a container location database (CLDB) configured to maintain information about where each of a plurality of containers is located;
   a plurality of cluster nodes, each cluster node containing one or more storage pools, each storage pool containing zero or more containers; and
   a plurality of inodes for structuring said file system objects within said containers; wherein said containers comprise file system objects, and said replicated containers preventing data loss comprise said containers replicated to other cluster nodes with one container designated as master container for each replication chain controlling transactions for said replication chain, said replication chain arranged in a linear pattern, a star pattern, or any combination of said linear and said star pattern, wherein said replication chain for said container is changed if a node holding any replica fails or is taken out of service, or if a node that previously contained a replica returns to service;
   wherein said maintained information about where each of said plurality of containers is located that is maintained in said CLDB is stored as inodes in containers;
   wherein said CLDB inodes are configured to maintain a database that contains at least following information about all of said containers:
   nodes that have replicas of a container; and
   an ordering of said replication chain for said container;
   wherein updates to said container are sent to said master container for said updated container;
   wherein changes to content of said container are propagated to said replicas of said container by said master container;
   wherein some file system objects are larger than a single container; and
   wherein some file system objects are spread over a larger number of nodes than a set represented by said replication chain of a single container.

2. The system of claim 1, wherein said replication chain is arranged in a linear replication pattern, in which a node holding said master container of said container propagates updates to a first slave node that contains another replica; and wherein said first slave node, in turn, propagates updates to a second slave node that contains a third replica of said container.

3. The system of claim 1, wherein said replication chain is arranged in a star replication pattern, in which a node containing said master container of a container propagates updates directly and simultaneously to all other nodes containing replicas of said container.

4. The system of claim 1, wherein when an update is received by a node containing said master container of said container, a lock is taken on a particular portion of a file being updated to guarantee that updates that change a same portion of said file are transactionally serialized; and wherein updates are made consistently on all replicas of said container.

5. The system of claim 1, wherein a number of update transactions that are allowed to be pending for a single file is limited to increase amount of parallelism available for updates.

6. The system of claim 1, wherein updates to said containers are acknowledged once enough of said nodes containing replicas have acknowledged that they have received said update.

7. The system of claim 1, wherein multiple updates are pending at a same time to increase potential parallelism, but all updates to said container are assigned a serial update identifier by said master container.

8. The system of claim 1, wherein updates are applied on different replicas in different orders, but only updates that have been acknowledged by all replicas are reported back to a client as committed.

9. The system of claim 1, wherein, before reporting an update as completed, all updates with smaller update identifiers are also completed.

10. The system of claim 1, wherein potentially out-of-date replicas are resynchronized to a current state of said master container of said container.

11. The system of claim 1, wherein when a node containing an out-of-date replica joins an existing replica chain, said node containing said out-of-date replica contacts said CLDB;

wherein said CLDB may decide that enough replicas are already known, in which case said node is instructed to discard said replica; and wherein said CLDB may also assign said out-of-date replica to said replication chain, at which point a resynchronization process is executed to bring said out-of-date container up to a current state.

12. The system of claim 1, wherein when a set of failing nodes does not include a node containing said master container, failing nodes are removed from said replication chain, but said master container survives; and wherein all other replicas are considered to be out-of-date.

13. The system of claim 1, wherein a file chunk and an original inode are updated in a coordinated fashion.

14. The system of claim 1, wherein an original inode and multiple file chunks are updated together.

15. The system of claim 1, further comprising: a distributed transaction in a form of a snapshot of a file system volume, consisting of directories and files spread over a number of containers;

wherein all data and meta-data for a volume is organized into a single name container and zero or more data containers; and wherein all cross-container references to data are segregated into said name container while keeping all of said data in data containers.

* * * * *